United States Patent
Ogawa et al.

(10) Patent No.: US 9,553,750 B2
(45) Date of Patent: *Jan. 24, 2017

(54) TRANSMITTER, RECEIVER, TRANSMISSION METHOD, AND RECEPTION METHOD

(71) Applicant: Sun Patent Trust, New York, NY (US)

(72) Inventors: Yoshihiko Ogawa, Kanagawa (JP); Akihiko Nishio, Osaka (JP); Masayuki Hoshino, Kanagawa (JP); Takashi Iwai, Ishikawa (JP)

(73) Assignee: Sun Patent Trust, New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/746,549

(22) Filed: Jun. 22, 2015

(65) Prior Publication Data

US 2015/0288550 A1 Oct. 8, 2015

Related U.S. Application Data

(63) Continuation of application No. 13/991,600, filed as application No. PCT/JP2011/007109 on Dec. 20, 2011, now Pat. No. 9,094,955.

(30) Foreign Application Priority Data

Jan. 7, 2011 (JP) .................................. 2011-001829
Jan. 20, 2011 (JP) .................................. 2011-009870

(51) Int. Cl.
*H04W 4/00* (2009.01)
*H04L 27/26* (2006.01)
(Continued)

(52) U.S. Cl.
CPC ......... *H04L 27/2613* (2013.01); *H04B 7/0632* (2013.01); *H04J 13/004* (2013.01);
(Continued)

(58) Field of Classification Search
USPC .......................... 370/241, 252, 328, 329, 330
See application file for complete search history.

(56) References Cited

U.S. PATENT DOCUMENTS 8,385,459 B2  2/2013 Ogawa et al.
8,571,120 B2  10/2013 Muharemovic et al.
(Continued)

FOREIGN PATENT DOCUMENTS

CA  2 714 455 A1  1/2010
TW  201014234 A  4/2010
(Continued)

OTHER PUBLICATIONS

Mediatek Inc., "Remaining Issues of Aperiodic SRS," R1-105237, 3GPP TSG RAN WG1 Meeting #62bis, Agenda Item: 6.5.2.1, Xi'an, China, Oct. 11-15, 2010, 3 pages.
(Continued)

*Primary Examiner* — Kwang B Yao
*Assistant Examiner* — Nguyen Ngo
(74) *Attorney, Agent, or Firm* — Seed IP Law Group LLP

(57) ABSTRACT

Provided is a transmitter which improves the flexibility of SRS resource allocation without increasing the amount of signaling for notifying the cyclic shift amount. In the transmitter, with regard to each basic shift amount candidate group having a basic shift amount from 0 to N−1, a transmission control unit (206) specifies the actual shift amount imparted to a cyclic shift sequence used in scrambling a reference signal transmitted from each antenna port, said specification being performed based on a table in which cyclic shift amount candidates correspond to each antenna port, and based on setting information transmitted from a base station (100). With regard to basic shift amount candidates for shift amount X, the table differentiates between an offset pattern comprising offset values for cyclic shift (Continued)

amount candidates corresponding to each antenna port and an offset pattern corresponding to basic shift amount candidates of X+N/2.

16 Claims, 19 Drawing Sheets

(51) Int. Cl.
| | |
|---|---|
| H04L 5/00 | (2006.01) |
| H04W 72/04 | (2009.01) |
| H04J 13/00 | (2011.01) |
| H04B 7/06 | (2006.01) |
| H04L 29/08 | (2006.01) |
| H04W 24/10 | (2009.01) |

(52) U.S. Cl.
CPC .......... *H04L 5/005* (2013.01); *H04L 5/0023* (2013.01); *H04L 5/0053* (2013.01); *H04L 69/324* (2013.01); *H04W 24/10* (2013.01); *H04W 72/04* (2013.01); *H04W 72/0406* (2013.01)

(56) References Cited

U.S. PATENT DOCUMENTS

| | | | |
|---|---|---|---|
| 8,605,571 B2 | 12/2013 | Takaoka et al. | |
| 8,711,815 B2 | 4/2014 | Kawamura et al. | |
| 8,817,753 B2 | 8/2014 | Kawamura et al. | |
| 8,958,488 B2* | 2/2015 | Noh | H04B 7/0613 |
| | | | 375/259 |
| 9,042,213 B2 | 5/2015 | Takaoka et al. | |
| 9,094,955 B2* | 7/2015 | Ogawa | H04L 5/0023 |
| 2008/0075184 A1 | 3/2008 | Muharemovic et al. | |
| 2010/0098012 A1 | 4/2010 | Bala et al. | |
| 2010/0195700 A1 | 8/2010 | Ogawa et al. | |
| 2011/0194551 A1* | 8/2011 | Lee | H04B 7/0626 |
| | | | 370/342 |
| 2012/0033630 A1* | 2/2012 | Chung | H04B 7/0473 |
| | | | 370/329 |
| 2012/0127961 A1 | 5/2012 | Kawamura et al. | |
| 2012/0163318 A1 | 6/2012 | Kishiyama et al. | |
| 2012/0275411 A1* | 11/2012 | Kim | H04L 5/0032 |
| | | | 370/329 |
| 2012/0275414 A1* | 11/2012 | Hu | H04B 7/0452 |
| | | | 370/329 |
| 2013/0077466 A1 | 3/2013 | Takaoka et al. | |
| 2013/0077543 A1* | 3/2013 | Kim | H04B 7/15507 |
| | | | 370/281 |
| 2014/0064241 A1 | 3/2014 | Takaoka et al. | |
| 2015/0131586 A1* | 5/2015 | Noh | H04W 72/042 |
| | | | 370/329 |

FOREIGN PATENT DOCUMENTS

| | | |
|---|---|---|
| TW | 201019769 A | 5/2010 |
| WO | 2009054144 A1 | 4/2009 |
| WO | 2010/032482 A1 | 3/2010 |
| WO | 2010/125943 A1 | 11/2010 |
| WO | 2010150806 A1 | 12/2010 |

OTHER PUBLICATIONS

English Translation of Taiwanese Search Report dated Oct. 21, 2015, for corresponding TW Application No. 100147985, 1 page.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
Mediatek Inc., "Details on Aperiodic SRS," R1-106007, 3GPP TSG RAN WG1 Meeting #63, Agenda Item: 6.5.2, Jacksonville, USA, Nov. 15-19, 2010, 3 pages.
International Search Report dated Mar. 19, 2012, for corresponding International Application No. PCT/JP2011/007109, 2 pages.

* cited by examiner

| CYCLIC SHIFT NUMBER OF EACH ANTENNA PORT | | | | OFFSET PATTERN "0, 4, 2, 6" | | | |
|---|---|---|---|---|---|---|---|
| (port)40 | 41 | 42 | 43 | | | | |
| (port)20 | 21 | ..... | ..... | | | | |
| (port)10 | ..... | ..... | ..... | | | | |
| 0 | 4 | 2 | 6 | | | | |
| 1 | 5 | 3 | 7 | | | | |
| 2 | 6 | 4 | 0 | | | | |
| 3 | 7 | 5 | 1 | | | | |
| 4 | 0 | 6 | 2 | | | | |
| 5 | 1 | 7 | 3 | | | | |
| 6 | 2 | 0 | 4 | | | | |
| 7 | 3 | 5 | 1 | | | | |

|  | \multicolumn{4}{c}{CYCLIC SHIFT NUMBER OF EACH ANTENNA PORT} |
| --- | --- | --- | --- | --- |
|  | (port)40 | 41 | 42 | 43 |
|  | (port)20 | 21 | ... | ... |
| 0 | 0 | 4 | 2 | 6 |
| 1 | 1 | 5 | 3 | 7 |
| 2 | 2 | 6 | 4 | 0 |
| 3 | 3 | 7 | 5 | 1 |
| 4 | 4 | 2 | 6 | 0 |
| 5 | 5 | 6 | 7 | 0 |
| 6 | 6 | 4 | 0 | 2 |
| 7 | 7 | 0 | 1 | 2 |

Rows 0–3: OFFSET PATTERN "0, 4, 2, 6"
Rows 4–7: OFFSET PATTERN DIFFERENT FROM "0, 4, 2, 6"

Rows 0 and 4 form a PAIR.

| | CYCLIC SHIFT NUMBER OF EACH ANTENNA PORT | | | | OFFSET PATTERN "0, 4, 2, 6" |
|---|---|---|---|---|---|
| (port)40 | 41 | 42 | 43 | | |
| (port)20 | 21 | | | | |
| 0 | 4 | 2 | 6 | | |
| 1 | 5 | 3 | 7 | | |
| 2 | 6 | 4 | 0 | | |
| 3 | 7 | 5 | 1 | | |
| 4 | 3 | 2 | 1 | | "0, 1, 2, 3" OR "0, -1, -2, -3" |
| 5 | 6 | 7 | 0 | | |
| 6 | 5 | 4 | 3 | | |
| 7 | 0 | 1 | 2 | | |

FIG. 8

| CYCLIC SHIFT NUMBER OF EACH ANTENNA PORT | | | | |
|---|---|---|---|---|
| (port)40 | 41 | 42 | 43 | |
| (port)20 | 21 | ... | ... | |
| 0 | 4 | 2 | 6 | ⎫ OFFSET PATTERN |
| 1 | 5 | 3 | 7 | ⎬ "0, 4, 2, 6" |
| 2 | 6 | 4 | 0 | |
| 3 | 7 | 5 | 1 | ⎭ |
| 4 | 3 | 1 | 2 | ⎫ OFFSET PATTERN "0, 1, 2, 3" |
| 5 | 6 | 0 | 7 | ⎬ NOT IN PARTICULAR ORDER |
| 6 | 5 | 3 | 4 | |
| 7 | 0 | 2 | 1 | ⎭ |

FIG. 11

| CYCLIC SHIFT NUMBER OF EACH ANTENNA PORT | | | | |
|---|---|---|---|---|
| (port)40 | (port)41 | (port)42 | (port)43 | |
| (port)20 | 21 | ...... | ...... | |
| 0 | 4 | 2 | 6 | |
| 5 | 1 | 7 | 3 | |
| 2 | 6 | 4 | 0 | |
| 7 | 3 | 1 | 5 | |
| 4 | 5 | 6 | 7 | |
| 1 | 0 | 7 | 6 | |
| 6 | 7 | 0 | 1 | |
| 3 | 2 | 1 | 0 | |

OFFSET PATTERN "0, 4, 2, 6"

| CYCLIC SHIFT NUMBER OF EACH ANTENNA PORT | | | | |
|---|---|---|---|---|
| (port)40 | 41 | 42 | 43 | |
| (port)20 | 21 | ... | ... | |
| 0 | 4 | 2 | 6 | ⎫ |
| 5 | 1 | 7 | 3 | ⎬ OFFSET PATTERN "0, 4, 2, 6" |
| 2 | 6 | 4 | 0 | ⎭ |
| 7 | 3 | 5 | 1 | |
| 4 | 5 | 6 | 7 | ⎫ |
| 1 | 0 | 7 | 6 | ⎬ "0, 1, 2, 3" OR "0, −1, −2, −3" |
| 6 | 7 | 0 | 1 | |
| 3 | 2 | 1 | 0 | ⎭ |

FIG. 13

| CYCLIC SHIFT NUMBER OF EACH ANTENNA PORT | | | | | | |
|---|---|---|---|---|---|---|
| (port)40 | 41 | 42 | 43 | | | |
| (port)20 | 21 | | | | | |
| 0 | 4 | 2 | 6 | } OFFSET PATTERN "0, 4, 2, 6" | | |
| 1 | 5 | 3 | 7 | | | |
| 2 | 6 | 4 | 0 | | | |
| 3 | 7 | 5 | 1 | | | |
| 4 | 0 | 5 | 1 | } OFFSET PATTERN "0, 4, 1, 5" | | |
| 5 | 1 | 6 | 2 | | | |
| 6 | 2 | 7 | 3 | | | |
| 7 | 3 | 0 | 4 | | | |

FIG. 14

| | | CYCLIC SHIFT NUMBER OF EACH ANTENNA PORT | | | |
|---|---|---|---|---|---|
| (port)40 | 41 | 42 | 43 | | |
| (port)20 | 21 | ... | ... | | |
| 0 | 4 | 2 | 6 | ⎫ | |
| 1 | 5 | 3 | 7 | ⎬ OFFSET PATTERN "0, 4, 2, 6" | |
| 2 | 6 | 4 | 0 | | |
| 3 | 7 | 5 | 1 | ⎭ | |
| 4 | 7 | 2 | 6 | ⎫ | |
| 5 | 0 | 3 | 7 | ⎬ OFFSET PATTERN "0, 3, A, B" | |
| 6 | 1 | 4 | 0 | | |
| 7 | 2 | 5 | 1 | ⎭ | |

FIG. 16

| CYCLIC SHIFT NUMBER OF EACH ANTENNA PORT | | | | |
|---|---|---|---|---|
| (port)40 | 41 | 42 | 43 | |
| (port)20 | 21 | ..... | ..... | |
| 0 | 4 | 2 | 6 | |
| 1 | 5 | 3 | 7 | |
| 2 | 6 | 4 | 0 | |
| 3 | 7 | 5 | 1 | |
| 4 | 6 | 0 | 2 | |
| 5 | 7 | 1 | 3 | |
| 6 | 0 | 2 | 4 | |
| 7 | 1 | 3 | 5 | |

Columns 41/21 and 42/... grouped as OFFSET PATTERN "0, 4, 2, 6"; columns 42 and 43 grouped as OFFSET PATTERN "0, 2, A, B".

FIG. 17

| CYCLIC SHIFT NUMBER OF EACH ANTENNA PORT | | | | | | | | |
|---|---|---|---|---|---|---|---|---|
| (port)40 | 41 | 42 | 43 | | | | | |
| (port)20 | 21 | ... | ... | | | | | |
| 0 | 4 | 2 | 6 | | | | | |
| 1 | 5 | 3 | 7 | | | | | |
| 2 | 6 | 4 | 5 | | | | | |
| 3 | 7 | 5 | 6 | | | | | |
| 4 | 6 | 0 | 2 | | | | | |
| 5 | 7 | 1 | 3 | | | | | |
| 6 | 5 | 4 | 3 | | | | | |
| 7 | 0 | 1 | 2 | | | | | |

OFFSET PATTERN "0, 4, 2, 6" — "0, 1, 2, 3" — "0, 2, 4, 6" — "0, −1, −2, −3"

DIFFERENT OFFSET PATTERNS

FIG. 18

| CYCLIC SHIFT NUMBER OF EACH ANTENNA PORT | | | | SRS ARRANGEMENT OF EACH ANTENNA PORT | | | | |
|---|---|---|---|---|---|---|---|---|
| (port)40 | 41 | 42 | 43 | (port)40 | 41 | 42 | 43 | |
| (port)20 | 21 | ...... | ...... | (port)20 | 21 | ...... | ...... | |
| 0 | 4 | 2 | 6 | FREQUENCY 1 | FREQUENCY 1 | | | FREQUENCY 1 ONLY |
| 1 | 5 | 3 | 7 | FREQUENCY 1 | FREQUENCY 1 | | | |
| 2 | 6 | 4 | 0 | FREQUENCY 1 | FREQUENCY 1 | | | |
| 3 | 7 | 5 | 1 | FREQUENCY 1 | FREQUENCY 1 | | | |
| 4 | 0 | 6 | 2 | FREQUENCY 1 | FREQUENCY 1 | FREQUENCY 2 | FREQUENCY 2 | FREQUENCIES 1 AND 2 ARE USED |
| 5 | 1 | 7 | 3 | FREQUENCY 1 | FREQUENCY 1 | FREQUENCY 2 | FREQUENCY 2 | |
| 6 | 2 | 0 | 4 | FREQUENCY 1 | FREQUENCY 1 | FREQUENCY 2 | FREQUENCY 2 | |
| 7 | 3 | 5 | 1 | FREQUENCY 1 | FREQUENCY 1 | FREQUENCY 2 | FREQUENCY 2 | |

FIG. 20

| CYCLIC SHIFT NUMBER OF EACH ANTENNA PORT | | | | SRS ARRANGEMENT OF EACH ANTENNA PORT | | | | |
|---|---|---|---|---|---|---|---|---|
| (port)40 | 41 | 42 | 43 | (port)40 | (port)20 | 41 | 42 | 43 |
| | 21 | ..... | ..... | | 21 | | ..... | ..... |
| 0 | 4 | 2 | 6 | | | FREQUENCY 1 | | |
| 1 | 5 | 3 | 7 | | | FREQUENCY 1 | | |
| 2 | 6 | 4 | 0 | | | FREQUENCY 1 | | |
| 3 | 7 | 5 | 1 | | | FREQUENCY 1 | | |
| 4 | 0 | 6 | 2 | FREQUENCY 1 | FREQUENCY 1 | FREQUENCY 2 | FREQUENCY 1 | FREQUENCY 2 |
| 5 | 1 | 7 | 3 | FREQUENCY 1 | FREQUENCY 1 | FREQUENCY 2 | FREQUENCY 1 | FREQUENCY 2 |
| 6 | 2 | 0 | 4 | FREQUENCY 1 | FREQUENCY 1 | FREQUENCY 2 | FREQUENCY 1 | FREQUENCY 2 |
| 7 | 3 | 5 | 1 | FREQUENCY 1 | FREQUENCY 1 | FREQUENCY 2 | FREQUENCY 1 | FREQUENCY 2 |

FREQUENCY 1 ONLY: columns 40, 41

FREQUENCIES 1 AND 2 ARE USED: columns 20, 42, 43

FIG. 21

TRANSMITTER, RECEIVER, TRANSMISSION METHOD, AND RECEPTION METHOD

BACKGROUND

Technical Field

The present invention relates to a transmitter apparatus, a receiver apparatus, a transmission method, and a reception method.

Description of the Related Art

In 3GPP LTE (3rd Generation Partnership Project Long-term Evolution, hereinafter, simply referred to as "LTE") and LTE-Advanced (hereinafter, simply referred to as "LTE-A"), Sounding Reference signal (SRS) is used as a reference signal for measuring uplink receiving quality (refer to Non-Patent Literature 1). To be more specific, SRS includes P-SRS (Periodic SRS) and DA-SRS (Dynamic Aperiodic SRS). For both types of SRS, SRS transmission timing is controlled according to trigger information transmitted from a base station to a terminal. However, while the P-SRS is controlled by a high-order layer, the DA-SRS is controlled by a control channel (that is, PDCCH) of a physical layer.

In order to transmit the SRS from a terminal to a base station, SRS resources (hereinafter, referred to as "common resources") which are common to all terminals are set. A notification of these common resources is performed with the cell units. For example, if a notification indicating that the common resources are first, third and eighth subframes is performed using control information, all terminals in a cell stop transmission of data signals during a predetermined time period (specifically, a final symbol) of each of the first, third and eighth subframes, and use the time period as a transmission resource of a reference signal.

In addition, information regarding a resource (that is, parameters used to identify a resource) which is practically allocated to each terminal in the common resources includes leading subframe, set band, transmission bandwidth, frame interval at which an SRS is mapped, and transmission time or the like. Each terminal is notified of this information by a higher-order layer than a physical layer.

Furthermore, SRSs are scrambled by an orthogonal sequence in each terminal and then transmitted. Furthermore, for a terminal that performs MIMO communication introduced in LTE-A, an SRS transmitted from each antenna port is scrambled by an orthogonal sequence and transmitted. That is, SRSs transmitted from a plurality of terminals or a terminal that performs MIMO communication are code-division multiplexed and transmitted.

Here, as the orthogonal sequence, a cyclic shift sequence (CS sequence) is used. More specifically, the terminal generates a transmission sequence used by the terminal itself by applying a cyclic shift corresponding to one of cyclic shift amounts 0 to 7 notified of from the base station (that is, notified by 3 bits) to a basic sequence generated by a ZC (Zadoff Chu) sequence. To be more specific, the terminal applies a cyclic shift to the basic sequence by a cyclic shift amount×symbol length/16 (ms) notified of from the base station. FIG. 1 shows a situation in which a basic sequence is cyclically shifted by ¼ symbol. On an LTE or LTE-A uplink, an SRS is arranged for every two subcarriers. Furthermore, on an LTE or LTE-A uplink, the same waveform is repeated twice within one symbol. For this reason, a waveform obtained by a cyclic shift of (8 to 15)×symbol length/16 (ms) is identical to a waveform obtained by a cyclic shift of (0 to 7)×symbol length/16 (ms).

When SRSs are transmitted from a plurality of antennas of one terminal (that is, in a case of MIMO communication), if the base station notifies the terminal of cyclic shift amounts at all antennas, the signaling amount becomes enormous. Such a problem is solved by a method of notifying of a cyclic shift amount disclosed in, for example, Non-Patent Literature 2. According to this method, a base station and a terminal share an offset pattern about offset values of cyclic shift amounts of a second antenna port, a third antenna port, and a fourth antenna port from the cyclic shift amount corresponding to a first antenna port (hereinafter, simply referred to as "offset pattern"). Here, the offset pattern is fixed. In this shared condition, the base station notifies the terminal of the cyclic shift amount (CS0) of the first antenna port using 3 bits. In this way, the terminal can calculate the respective cyclic shift amounts corresponding to the second antenna port, the third antenna port, and the fourth antenna port from the notified cyclic shift amount (CS0) of the first antenna port. That is, the cyclic shift amount of an i-th antenna port can be calculated from $CS_i = CS_0 + k \mod 8$. Here, i is an antenna port identification number (0 to 3) and k is an offset value of an antenna port with identification number i with respect to the cyclic shift amount of the antenna port with identification number 0.

FIG. 2 shows an example of correspondence table in which with regard to eight cyclic shift amount candidates of an antenna port with identification number 0, four antenna port identification numbers are associated with cyclic shift amounts corresponding to the respective antenna port identification numbers.

As is clear from FIG. 2, in the case of 4 antenna ports (that is, the case of 4-antenna MIMO transmission), the offset pattern is "0, 4, 2, 6" (for i=0, 1, 2, 3). On the other hand, in the case of 2 antenna ports (that is, the case of 2-antenna MIMO transmission), the offset pattern is "0, 4" (for i=0, 1). Here, in FIG. 2, antenna port 10 means a first antenna port when one antenna port is used. Furthermore, antenna ports 20 and 21 mean first and second antenna ports, respectively, when two antenna ports are used. Furthermore, antenna ports 40, 41, 42 and 43 mean first, second, third and fourth antenna ports, respectively, when four antenna ports are used. Using such offset patterns causes a CS interval to become a maximum between antenna ports, and when SRSs are transmitted from two antenna ports or when SRSs are transmitted from four antenna ports, the SRS demultiplexing accuracy becomes the highest. Furthermore, by causing the first two elements of the offset pattern in the case of 4 antenna ports to match the offset pattern in the case of 2 antenna ports, it is possible to use a common correspondence table for the cases of 4 antenna ports and 2 antenna ports. A common correspondence table may be used for the cases of 1 antenna port, 2 antenna ports and 4 antenna ports as well.

CITATION LIST

Non-Patent Literature

NPL 1

TS36.211 v8.9.0 "3GPP TSG RAN; Evolved Universal Terrestrial Radio Access (E-UTRA); Physical Channels and Modulation"

NPL 2

R1-106007 (Mediatek Inc) Details on Aperiodic SRS

BRIEF SUMMARY

Technical Problem

However, as described above, when offset pattern "0, 4, 2, 6" is used in a fixed manner, in the case of 2 antenna ports, CSs cannot be allocated to the two antenna ports unless two CSs having a 4-CS interval are vacant, and on the other hand, in the case of 4 antenna ports, CSs cannot be allocated to the four antenna ports unless four CSs having a 2-CS interval are vacant. That is, there is a problem that flexibility of resource allocation for SRSs is low. To be more specific, when 4 antenna ports are used, all of cyclic shift amounts "0, 2, 4, 6" or "1, 3, 5, 7" need to be unused. For example, when cyclic shift amount "0" is already used, if cyclic shift amount "0, 2, 4, 6" is further used at 4 antenna ports, cyclic shift amounts "0" are simultaneously transmitted from two terminals and the base station cannot demultiplex them.

It is an object of the present invention to provide a transmitter apparatus, a receiver apparatus, a transmission method, and a reception method that improve flexibility of SRS resource allocation without increasing an amount of signaling for notification of a cyclic shift amount.

Solution to Problem

A transmitter apparatus according to an aspect of the present invention is a transmitter apparatus that transmits reference signals scrambled by a cyclic shift sequence from at least some of L (L is a natural number equal to or greater than 2) respective antenna ports, including: a receiving section that receives setting information indicating a reference shift amount given to a cyclic shift sequence used to scramble a reference signal transmitted from a reference antenna port among the L antenna ports; a specification section that specifies an amount of shift given to a cyclic shift sequence used to scramble a reference signal transmitted from each antenna port based on the setting information and a correspondence in which a cyclic shift amount candidate is associated with each antenna port for each of reference shift amount candidate groups having reference shift amounts 0 to N−1 (N is an even number equal to or greater than 8); and a forming section that forms a cyclic shift sequence based on the specified amount of shift, in which in the correspondence, an offset pattern made up of offset values of cyclic shift amount candidates associated with each antenna port with respect to a reference shift amount candidate of reference shift amount X (X is a natural number from 0 to N/2−1 inclusive) is different from an offset pattern made up of offset values of cyclic shift amount candidates associated with each antenna port with respect to a reference shift amount candidate of reference shift amount X+N/2.

A transmitter apparatus according to another aspect of the present invention includes: a signal forming section that maps a reference signal generated using information relating to a cyclic shift amount to a frequency resource corresponding to each of a plurality of antenna ports determined based on a first correspondence or a second correspondence; and a transmitting section that transmits the reference signal mapped to the frequency resource corresponding to each of the plurality of antenna ports, in which the first correspondence which is a correspondence between each of the plurality of antenna ports and the frequency resource when the information relating to the cyclic shift amount is X is different from the second correspondence which is a correspondence between each of the plurality of antenna ports and the frequency resource when the information relating to the cyclic shift amount is X+N/2 (where X is an integer from 0 to N/2−1 inclusive, and N is the number of candidates of the cyclic shift amount).

A receiver apparatus according to an aspect of the present invention is a receiver apparatus that receives a reference signal scrambled by a cyclic shift sequence from at least some of L (L is a natural number equal to or greater than 2) respective antenna ports, including: a generation section that generates setting information indicating a reference shift amount given to a cyclic shift sequence used to scramble a reference signal transmitted from a reference antenna port among the L antenna ports; a transmitting section that transmits the setting information to a transmitter apparatus of the reference signal; and a receiving section that specifies an amount of shift given to a cyclic shift sequence used to scramble a reference signal transmitted from each antenna port based on the setting information and a correspondence in which a cyclic shift amount candidate is associated with each antenna port for each of reference shift amount candidate groups having reference shift amounts 0 to N−1 (N is an even number equal to or greater than 8) and receives the reference signal using the specified amount of shift, in which in the correspondence, an offset pattern made up of offset values of cyclic shift amount candidates associated with each antenna port with respect to a reference shift amount candidate of reference shift amount X (X is a natural number from 0 to N/2−1 inclusive) is different from an offset pattern made up of offset values of cyclic shift amount candidates associated with each antenna port with respect to a reference shift amount candidate of reference shift amount X+N/2.

A receiver apparatus according to another aspect of the present invention includes: a receiving section that receives a reference signal mapped to a frequency resource corresponding to each of a plurality of antenna ports determined based on a first correspondence or a second correspondence, the reference signal being generated using information relating to a cyclic shift amount; and a channel quality measuring section that measures channel quality using the reference signal, in which the first correspondence which is a correspondence between each of the plurality of antenna ports and the frequency resource when the information relating to the cyclic shift amount is X is different from the second correspondence which is a correspondence between each of the plurality of antenna ports and the frequency resource when the information relating to the cyclic shift amount is X+N/2 (where X is an integer from 0 to N/2−1 inclusive, and N is the number of candidates of the cyclic shift amount).

A transmission method according to an aspect of the present invention is a transmission method for transmitting a reference signal scrambled by a cyclic shift sequence from at least some of L (L is a natural number equal to or greater than 2) respective antenna ports, including: receiving setting information indicating a reference shift amount given to a cyclic shift sequence used to scramble a reference signal transmitted from a reference antenna port among the L antenna ports; specifying an amount of shift given to a cyclic shift sequence used to scramble a reference signal transmitted from each antenna port based on the setting information and a correspondence in which a cyclic shift amount candidate is associated with each antenna port for each of reference shift amount candidate groups having reference shift amounts 0 to N−1 (N is an even number equal to or greater than 8); and forming a cyclic shift sequence based on the specified amount of shift, in which in the correspondence, an offset pattern made up of offset values of cyclic shift amount candidates associated with each antenna port with respect to a reference shift amount candidate of reference shift amount X (X is a natural number from 0 to N/2−1 inclusive) is different from an offset pattern made up of offset values of cyclic shift amount candidates associated with each antenna port with respect to a reference shift amount candidate of reference shift amount X+N/2.

A transmission method according to another aspect of the present invention includes: mapping a reference signal generated using information relating to a cyclic shift amount to a frequency resource corresponding to each of a plurality of antenna ports determined based on a first correspondence or a second correspondence; and transmitting the reference signal mapped to the frequency resource corresponding to each of the plurality of antenna ports, in which the first correspondence which is a correspondence between each of the plurality of antenna ports and the frequency resource when the information relating to the cyclic shift amount is X is different from the second correspondence which is a correspondence between each of the plurality of antenna ports and the frequency resource when the information relating to the cyclic shift amount is X+N/2 (where, X is an integer from 0 to N/2−1 inclusive, N is the number of candidates of the cyclic shift amount).

A reception method according to an aspect of the present invention is a method for receiving a reference signal scrambled by a cyclic shift sequence from at least some of L (L is a natural number equal to or greater than 2) respective antenna ports, including: transmitting setting information indicating a reference shift amount given to a cyclic shift sequence used to scramble a reference signal transmitted from a reference antenna port among the L antenna ports to a transmitter apparatus of the reference signal; specifying an amount of shift given to a cyclic shift sequence used to scramble a reference signal transmitted from each antenna port based on the setting information and a correspondence in which a cyclic shift amount candidate is associated with each antenna port for each of reference shift amount candidate groups having reference shift amounts 0 to N−1 (N is an even number equal to or greater than 8); and receiving the reference signal using the specified amount of shift, in which in the correspondence, an offset pattern made up of offset values of cyclic shift amount candidates associated with each antenna port with respect to a reference shift amount candidate of reference shift amount X (X is a natural number from 0 to N/2−1 inclusive) is different from an offset pattern made up of offset values of cyclic shift amount candidates associated with each antenna port with respect to a reference shift amount candidate of reference shift amount X+N/2.

A reception method according to another aspect of the present invention includes: receiving a reference signal mapped to a frequency resource corresponding to each of a plurality of antenna ports determined based on a first correspondence or a second correspondence, the reference signal being generated using information relating to a cyclic shift amount; and measuring channel quality using the reference signal, in which the first correspondence which is a correspondence between each of the plurality of antenna ports and the frequency resource when the information relating to the cyclic shift amount is X is different from the second correspondence which is a correspondence between each of the plurality of antenna ports and the frequency resource when the information relating to the cyclic shift amount is X+N/2 (where X is an integer from 0 to N/2−1 inclusive, and N is the number of candidates of the cyclic shift amount).

Advantageous Effects of Invention

According to the present invention, it is possible to provide a transmitter apparatus, a receiver apparatus, a transmission method, and a reception method that improves flexibility of SRS resource allocation without increasing an amount of signaling for notification of a cyclic shift amount.

BRIEF DESCRIPTION OF THE SEVERAL VIEWS OF THE DRAWINGS

FIG. 2 is a diagram illustrating an example of a correspondence table in which with regard to eight cyclic shift amount candidates for an antenna port with identification number 0, four antenna port identification numbers are associated with cyclic shift amounts corresponding to the respective antenna port identification numbers;

FIG. 7 is a diagram illustrating a code resource setting rule table according to Embodiment 1 of the present invention;

FIG. 8 is a diagram illustrating a code resource setting rule table according to Embodiment 2 of the present invention;

FIG. 11 is a diagram illustrating another code resource setting rule table according to Embodiment 2 of the present invention;

FIG. 12 is a diagram illustrating a code resource setting rule table according to Embodiment 3 of the present invention;

FIG. 13 is a diagram illustrating another code resource setting rule table according to Embodiment 3 of the present invention;

FIG. 14 is a diagram illustrating a code resource setting rule table according to Embodiment 4 of the present invention;

FIG. 16 is a diagram illustrating a code resource setting rule table according to Embodiment 5 of the present invention;

FIG. 17 is a diagram illustrating a code resource setting rule table according to Embodiment 6 of the present invention;

FIG. 18 is a diagram illustrating a code resource setting rule table according to Embodiment 7 of the present invention;

FIG. 20 is a diagram illustrating a code frequency resource setting rule table according to Embodiment 8 of the present invention; and FIG. 21 is a diagram illustrating another code frequency resource setting rule table according to Embodiment 8 of the present invention.

DETAILED DESCRIPTION

Figure 1:
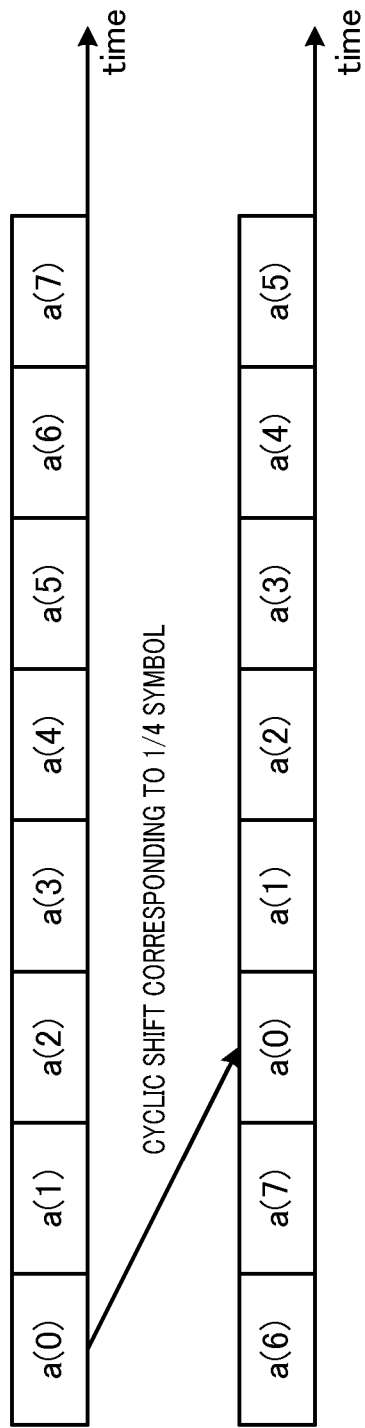
FIG. 1 is a diagram illustrating a situation in which a basic sequence is cyclically shifted by a ¼ symbol.

Hereinafter, embodiments of the present invention will be described in detail with reference to the accompanying drawings. In addition, in the embodiments, the same constituent elements are given the same reference numerals, and repeated description thereof will be omitted.

Embodiment 1

[Overview of Communication System]

A communication system according to Embodiment 1 of the present invention includes base station 100 and terminal 200. Base station 100 is an LTE-A base station, and terminal 200 is an LTE-A terminal. Furthermore, terminal 200 transmits a reference signal scrambled by a cyclic shift sequence obtained by applying a cyclic shift to a basic sequence from at least some of L (L is a natural number equal to or greater than 2) antenna ports. Base station 100 then receives the reference signal scrambled by a cyclic shift sequence obtained by applying a cyclic shift to a basic sequence from at least some of L (L is a natural number equal to or greater than 2) antenna ports.

Figure 3:
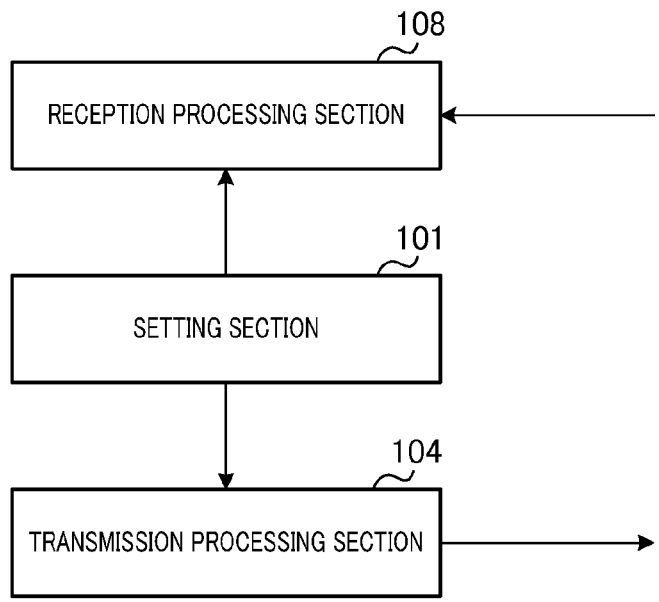
FIG. 3 is a principal configuration diagram of a base station according to Embodiment 1 of the present invention.

FIG. 3 is a principal configuration diagram of base station 100 according to Embodiment 1 of the present invention. In base station 100, setting section 101 generates setting information relating to a reference shift amount given to a cyclic shift sequence used to scramble a reference signal transmitted from a reference antenna port among L (L is a natural number equal to or greater than 2) antenna ports. The generated setting information is transmitted to terminal 200 via transmission processing section 104. Furthermore, reception processing section 108 specifies an actual shift amount given to a cyclic shift sequence used to scramble a reference signal transmitted from each antenna port and receives the reference signal using the specified actual shift amount based on a correspondence in which a cyclic shift amount candidate is associated with each antenna port and setting information for each of reference shift amount candidate groups having shift amounts 0 to N−1 (N is an even number equal to or greater than 8) that a reference shift amount can take. In the above-described correspondence, an offset pattern made up of offset values of cyclic shift amount candidates associated with each antenna port with respect to a reference shift amount candidate of shift amount X (X is a natural number from 0 to N/2−1 inclusive) is different from an offset pattern made up of offset values of cyclic shift amount candidates associated with each antenna port with respect to a reference shift amount candidate of X+N/2.

Figure 4:
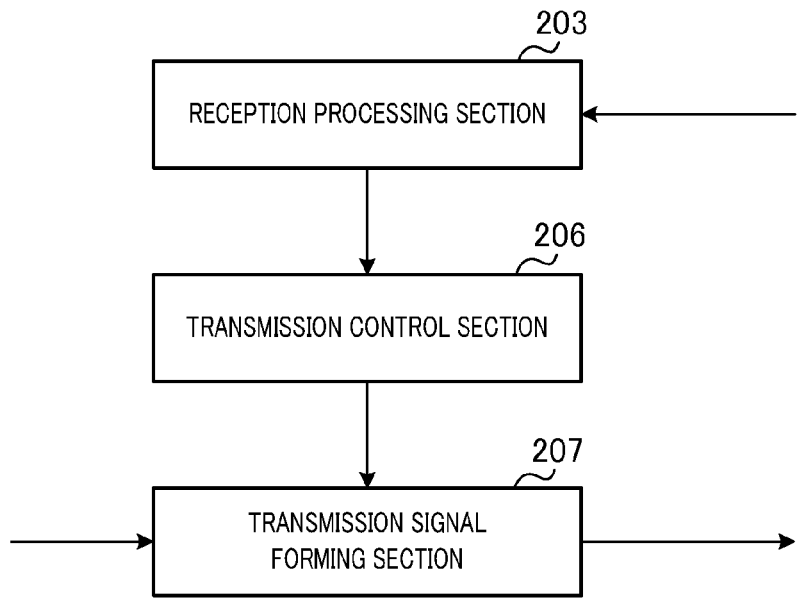
FIG. 4 is a principal configuration diagram of a terminal according to Embodiment 1 of the present invention.

FIG. 4 is a principal configuration diagram of terminal 200 according to Embodiment 1 of the present invention. In terminal 200, reception processing section 203 receives setting information relating to a reference shift amount given to a cyclic shift sequence used to scramble a reference signal transmitted from a reference antenna port among the L antenna ports. Transmission control section 206 specifies an actual shift amount given to a cyclic shift sequence used to scramble a reference signal transmitted from each antenna port based on a correspondence in which a cyclic shift amount candidate is associated with each antenna port and the setting information for each of reference shift amount candidate groups having shift amounts 0 to N−1 (N is an even number equal to or greater than 8) that a reference shift amount can take. In the above-described correspondence, an offset pattern made up of offset values of cyclic shift amount candidates associated with each antenna port with respect to a reference shift amount candidate of shift amount X (X is a natural number from 0 to N/2−1 inclusive) is different from an offset pattern made up of offset values of cyclic shift amount candidates associated with each antenna port with respect to a reference shift amount candidate of X+N/2. Transmission signal forming section 207 then maps a reference signal multiplied by the cyclic shift sequence formed based on the specified actual shift amount.

[Configuration of Base Station 100]

Figure 5:
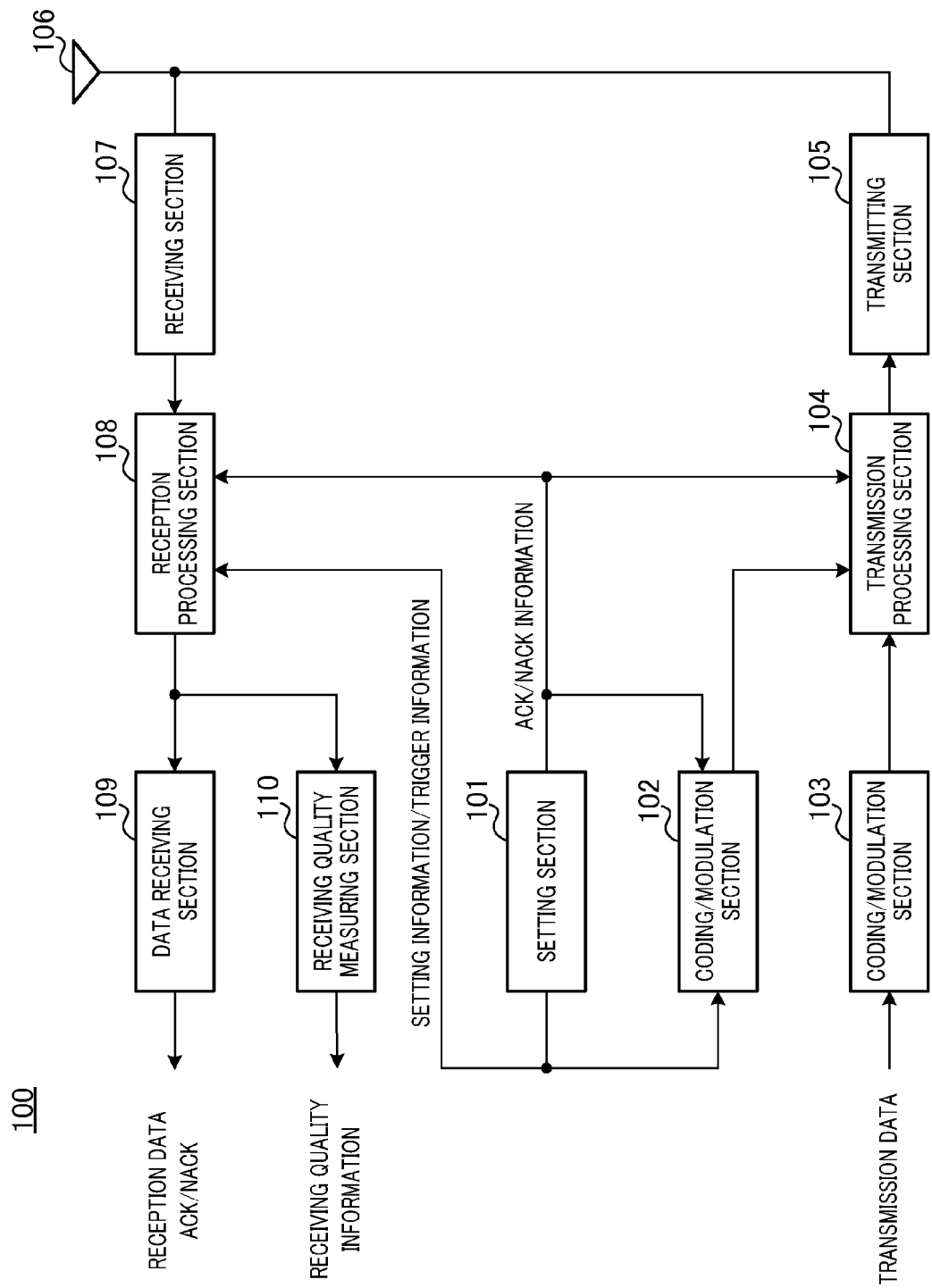
FIG. 5 is a block diagram illustrating a configuration of the base station according to Embodiment 1 of the present invention.

FIG. 5 is a block diagram illustrating a configuration of base station 100 according to Embodiment 1 of the present invention. In FIG. 5, base station 100 includes setting section 101, coding/modulation sections 102 and 103, transmission processing section 104, transmitting section 105, antenna 106, receiving section 107, reception processing section 108, data receiving section 109, and receiving quality measuring section 110.

Setting section 101 generates "candidate resources setting information" for setting a "candidate resource" of setting target terminal 200. This candidate resource is a resource to which setting target terminal 200 can map an SRS. The candidate resource setting information can be divided into "time/frequency resource setting information" and "code resource setting information." The time/frequency resource setting information includes a leading subframe and a leading frequency band at which setting target terminal 200 starts to set a candidate resource and a frequency bandwidth or the like available to setting target terminal 200. Furthermore, the code resource setting information includes "information relating to a cyclic shift amount" or the like. Here, the "information relating to a cyclic shift amount" is information relating to a shift amount of a cyclic shift sequence used for SRSs transmitted from a reference antenna port which serves as a reference. Here, particularly, a cyclic shift amount regarding an antenna port whose antenna port identification information is zero is used as the "information relating to a cyclic shift amount."

When the SRS that setting target terminal 200 is instructed to transmit is a DA-SRS in particular, setting section 101 generates trigger information for instructing terminal 200 to start transmission of a DA-SRS. When the SRS is a P-SRS, information relating to a trigger to start transmission of a P-SRS is included in, for example, time/frequency resource setting information.

As described above, the candidate resource setting information generated by setting section 101 is transmitted as setting information to setting target terminal 200 via coding/modulation section 102, transmission processing section 104, and transmitting section 105. Furthermore, the trigger information is likewise transmitted to setting target terminal 200 via coding/modulation section 102, transmission processing section 104, and transmitting section 105. Furthermore, the setting information and the trigger information are also outputted to reception processing section 108.

In addition, setting section 101 generates allocation control information which includes resource (RB) allocation information and MCS information regarding one or a plurality of transport blocks (TB). The allocation control information is constituted by allocation control information regarding an uplink resource (for example, PUSCH (Physical Uplink Shared Channel)) for allocating uplink data, and allocation control information regarding a downlink resource (for example, PDSCH (Physical Downlink Shared Channel)) for allocating downlink data. In addition, the allocation control information regarding the uplink resource is outputted to coding/modulation section 102 and reception processing section 108, and the allocation control information regarding the downlink resource is outputted to coding/modulation section 102 and transmission processing section 104.

Here, a notification of the setting information is sent from base station 100 to terminal 200 as high-order layer information (that is, through RRC signaling). On the other hand, a notification of the allocation control information and the trigger information is sent from base station 100 to terminal 200 using PDCCH (Physical Downlink Control Channel). In other words, while the setting information has a relatively long notification interval (that is, the notification is performed at a relatively long interval), the allocation control information and the trigger information have a short notification interval (that is, the notification is performed at a short interval).

Coding/modulation section 102 codes and modulates the setting information, the trigger information, and the allocation control information received from setting section 101, and outputs the obtained modulation signal to transmission processing section 104.

Coding/modulation section 103 codes and modulates an input data signal, and outputs the obtained modulation signal to transmission processing section 104.

Transmission processing section 104 maps the modulation signals received from coding/modulation section 102 and coding/modulation section 103 to a resource indicated by the downlink resource allocation information received from setting section 101, thereby forming a transmission signal. Here, in a case where the transmission signal is an OFDM signal, the modulation signals are mapped to a resource indicated by the downlink resource allocation information received from setting section 101, are transformed into a time waveform through an inverse fast Fourier transform (IFFT) process, and have CP (Cyclic Prefix) added thereto, thereby forming an OFDM signal.

Transmitting section 105 performs wireless processes (up-conversion, digital-analog (D/A) conversion, and the like) on the transmission signal received from transmission processing section 104, and transmits a resultant signal via antenna 106.

Receiving section 107 performs wireless processes (down-conversion, analog-digital (A/D) conversion, and the like) on a wireless signal received via antenna 106, and outputs the obtained received signal to reception processing section 108.

Reception processing section 108 specifies a resource to which the uplink data signal and ACK/NACK information are mapped based on the uplink resource allocation information received from setting section 101, and extracts a signal component mapped to the specified resource from the received signal.

In addition, reception processing section 108 specifies a resource to which the SRS is mapped based on the setting information and the trigger information received from setting section 101.

To be more specific, reception processing section 108 specifies a time/frequency resource to which the SRS is mapped based on the "time/frequency resource setting information" and the trigger information. Furthermore, reception processing section 108 specifies a code resource to which the SRS is mapped (that is, cyclic shift amount of a cyclic shift sequence used to transmit the SRS) based on the "code resource setting information" and the "code resource setting rule table."

Reception processing section 108 then generates a plurality of cyclic shift sequences (that is, cyclic shift sequence set) corresponding to the plurality of specified cyclic shift amounts. Reception processing section 108 then extracts a signal component mapped to the specified time/frequency resource from the received signal and demultiplexes the plurality of code-multiplexed SRSs using the generated cyclic shift sequence set.

Here, in a case where the received signal is a spatially multiplexed signal (that is, transmitted using a plurality of code words (CWs)), reception processing section 108 demultiplexes the received signal for each CW. In addition, in a case where the received signal is an OFDM signal, reception processing section 108 transforms the received signal into a time domain signal by performing an IDFT (Inverse Discrete Fourier Transform) process on the extracted signal component.

The uplink data signal and the ACK/NACK information extracted by reception processing section 108 in this way are outputted to data receiving section 109, and the SRS is outputted to receiving quality measuring section 110.

Data receiving section 109 decodes the signal received from reception processing section 108. Thereby, the uplink data and the ACK/NACK information are obtained.

Receiving quality measuring section 110 measures receiving quality of each frequency resource unit on the basis of the SRS received from reception processing section 108, and outputs receiving quality information.

In addition, a notification of the setting information (the candidate resource setting information and the transmission method setting information) is preferably performed using high-order layer information in which a notification interval is long from the viewpoint of signaling in a case where traffic circumstances do not vary in a cell of base station 100 or average receiving quality is desired to be measured. In addition, a notification of a portion or all of these various offset amounts is performed as broadcast information, thereby further reducing a notification amount. However, in a case where the setting information is required to be more dynamically changed depending on traffic circumstances or the like, a notification of a portion or all of these offset amounts is preferably performed using PDCCH in which a notification interval is short.

[Configuration of Terminal 200]

Figure 6:
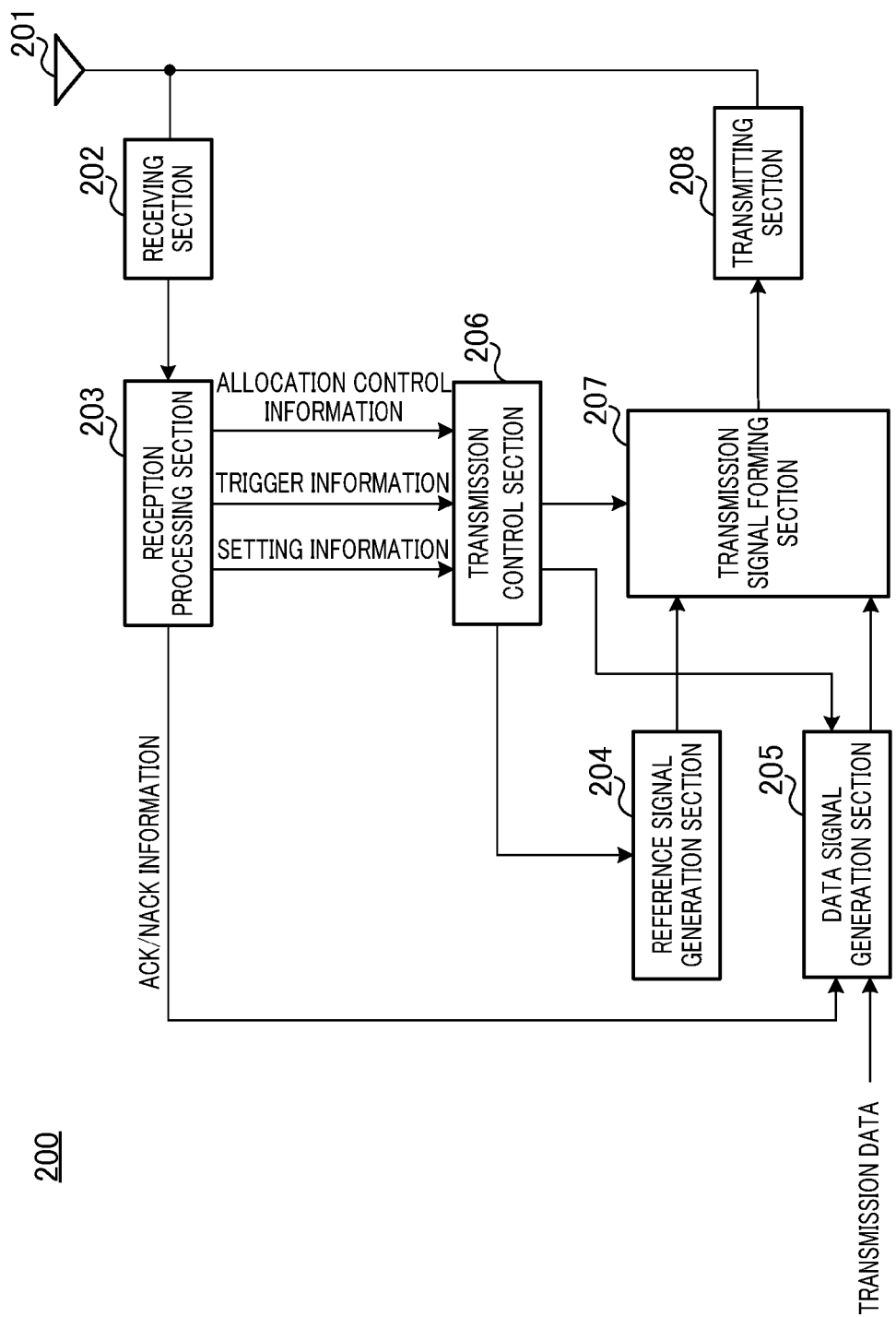
FIG. 6 is a block diagram illustrating a configuration of the terminal according to Embodiment 1 of the present invention.

FIG. 6 is a block diagram illustrating a configuration of terminal 200 according to Embodiment 1 of the present invention. Here, terminal 200 is an LTE-A terminal.

In FIG. 6, terminal 200 includes antenna 201, receiving section 202, reception processing section 203, reference signal generation section 204, data signal generation section 205, transmission control section 206, transmission signal forming section 207, and transmitting section 208

Receiving section 202 performs wireless processes (down-conversion, analog-digital (A/D) conversion, and the like) on a wireless signal received via antenna 201, and outputs the obtained received signal to reception processing section 203.

Reception processing section 203 extracts the setting information, the allocation control information, the trigger information, and the data signal included in the received signal. Reception processing section 203 outputs the setting information, the allocation control information, and the trigger information to transmission control section 206. In addition, reception processing section 203 performs an error detection process on the extracted data signal, and outputs ACK/NACK information corresponding to the error detection result to data signal generation section 205.

When a generation instruction signal is received from transmission control section 206, reference signal generation section 204 generates a reference signal which is outputted to transmission signal forming section 207.

Data signal generation section 205 receives the ACK/NACK information and transmission data, and codes and modulates the ACK/NACK information and the transmission data on the basis of MCS information received from transmission control section 206, thereby generating a data signal. In a case of Non-MIMO transmission, a data signal is generated using a single code word (CW), and, in a case of MIMO transmission, a data signal is generated using two (or a plurality of) code words. In addition, in a case where the received signal is an OFDM signal, data signal generation section 205 also performs a CP removal process and an FFT process.

Transmission control section 206 sets a candidate resource to which its own terminal maps the SRS. To be more specific, transmission control section 206 specifies a candidate time/frequency resource on the basis of the setting information (the time/frequency resource setting information) received from reception processing section 203. Furthermore, transmission control section 206 specifies a candidate code resource (that is, cyclic shift amount of a cyclic shift sequence used to transmit the SRS) based on the setting information (code resource setting information) received from reception processing section 203 and the "code resource setting rule table." When the trigger information is received from reception processing section 203, transmission control section 206 outputs information relating to a cyclic shift amount of a cyclic shift sequence used to transmit the SRS to transmission signal forming section 207. The candidate code resource set in terminal 200 will be described in detail later.

In addition, when the trigger information is received from reception processing section 203, transmission control section 206 determines an "RS mapping resource" to which the SRS is practically mapped in the candidate time/frequency resource, outputs information (hereinafter, also referred to as "RS mapping resource information") regarding the determined RS mapping resource to transmission signal forming section 207, and also outputs a generation instruction signal of a reference signal to reference signal generation section 204.

In addition, transmission control section 206 specifies a "data mapping resource" to which the data signal is mapped on the basis of the allocation control information received from reception processing section 203, outputs information (hereinafter, referred to as "data mapping resource information") regarding the data mapping resource to transmission signal forming section 207, and also outputs the MCS information included in the allocation control information to data signal generation section 205.

Transmission signal forming section 207 maps the SRS received from reference signal generation section 204 to an RS mapping resource indicated by the RS mapping information. Transmission signal forming section 207 then applies a cyclic shift corresponding to information regarding the cyclic shift amount received from transmission control section 206 to a reference sequence, thereby generates a cyclic shift sequence set, and multiplies the SRS mapped to the RS mapping resource by the cyclic shift sequence set. The SRSs multiplied by the plurality of respective cyclic shift sequences constituting the cyclic shift sequence set are transmitted from the corresponding antenna ports. The plurality of SRSs are code-multiplexed in this way.

In addition, transmission signal forming section 207 maps the data signal received from data signal generation section 205 to a data mapping resource indicated by the data mapping resource information. In this way, a transmission signal is formed. In addition, in a case of Non-MIMO transmission, a data signal of one code word is allocated to one layer, and, in a case of MIMO transmission, a data signal of two (or a plurality of) code words is allocated to a plurality of layers. Further, in a case where the transmission signal is an OFDM signal, transmission signal forming section 207 performs a DFT (Discrete Fourier Transform) process on the data signal which is then mapped to the data mapping resource. In addition, CP is added to the formed transmission signal.

Transmitting section 208 performs wireless processes (up-conversion, digital-analog (D/A) conversion, and the like) on the transmission signal formed by transmission signal forming section 207, and transmits a resultant signal via antenna 201.

[Operations of base station 100 and terminal 200]

Operations of base station 100 and terminal 200 having the above-described configurations will be described. Here, particularly, a candidate code resource setting process for setting target terminal 200, a transmission process of an SRS using the candidate code resource by terminal 200, and a reception process of the SRS transmitted from terminal 200 by base station 100 will be described. Furthermore, particularly, a case will be described where terminal 200 transmits SRSs using two antenna ports or four antenna ports.

<Candidate Code Resource Setting Process for Setting Target Terminal 200>

Setting section 101 generates candidate code resource setting information for setting a candidate code resource for setting target terminal 200. To be more specific, setting section 101 generates information relating to a shift amount of a cyclic shift sequence used for an SRS transmitted from the reference antenna port of setting target terminal 200. Here, particularly, the cyclic shift amount regarding an antenna port whose antenna port identification information is zero is used as information relating to the cyclic shift amount.

The candidate code resource setting information generated in this way is transmitted to terminal 200.

<SRS Transmission Process Using Candidate Code Resource by Terminal 200>

Transmission control section 206 sets a candidate code resource to which its own terminal maps the SRS. To be more specific, transmission control section 206 specifies a candidate code resource (that is, cyclic shift amount of a cyclic shift sequence used to transmit the SRS) based on the code resource setting information received from reception processing section 203 and a code resource setting rule table.

FIG. 7 is a diagram illustrating a code resource setting rule table according to Embodiment 1 of the present invention. In the code resource setting rule table, for each of a plurality of cyclic shift amount candidates of the reference antenna port, four antenna port identification numbers are associated with cyclic shift amounts corresponding to the respective antenna port identification numbers. The number of cyclic shift amount candidates is 8 from 0 to 7. As described above, the reference antenna port is an antenna port with identification number 0. In FIG. 7, basic offset pattern "0, 4, 2, 6" is applied to cyclic shift amount candidates 0 to 3 of the antenna port with identification number 0, whereas an offset pattern different from the basic offset pattern is applied to cyclic shift amount candidates 4 to 7 of the antenna port with identification number 0. That is, in generalized expression, different offset patterns are applied to cyclic shift amount candidate X and cyclic shift amount candidate X+4 of the antenna port with identification number 0. Particularly, the basic offset pattern is applied to cyclic shift amount candidate X. Here, X is an integer from 0 to 3 inclusive.

In further generalized expression, when the number of the plurality of cyclic shift amount candidates of the reference antenna port is assumed to be N (N is equal to or greater than 8 and power of 2), different offset patterns are applied to cyclic shift amount candidate X and cyclic shift amount candidate X+N/2. Here, X is an integer from 0 to (N/2−1) inclusive. Alternatively, X may be (X−N/2) mod N.

The flexibility of SRS resource allocation can be improved by using such a code resource setting rule table including a plurality of offset patterns. Furthermore, by sharing the code resource setting rule table between base station 100 and terminal 200 beforehand, base station 100 needs only to transmit information relating to the cyclic shift amount corresponding to the reference antenna port to terminal 200, and can thereby prevent the amount of signaling from increasing.

To be more specific, 2-antenna-port transmission allows all shift amount pairs "0, 4," "1, 5," "2, 6" and "3, 7" made up of two cyclic shift amounts to be used and 4-antenna-port transmission allows both shift amount groups "0, 2, 4, 6" and "1, 3, 5, 7" made up of four cyclic shift amounts to be used. Thus, it is possible to secure the flexibility of SRS resource allocation equivalent to that when the correspondence table shown in FIG. 2 is used. For example, when terminal 1 uses "0, 4" and terminal 2 uses "1," in the table in FIG. 2, terminal 3 has no choice but to select "3, 7" or "2, 6," whereas in the table in FIG. 7, terminal 3 has choice to select "3, 7", "2, 6" or "5, 6."

Transmission signal forming section 207 then applies a cyclic shift corresponding to information relating to the cyclic shift amount received from transmission control section 206 to the reference sequence, and thereby generates a cyclic shift sequence set and multiplies an SRS mapped to the RS mapping resource by the cyclic shift sequence set. The SRSs multiplied by the plurality of respective cyclic shift sequences that constitute the cyclic shift sequence set are transmitted from the corresponding antenna ports. In this way, the plurality of SRSs are code-multiplexed.

<Reception Process of SRS Transmitted from Terminal 200 by Base Station 100>

Reception processing section 108 specifies a code resource to which an SRS is mapped (that is, cyclic shift amount of a cyclic shift sequence used to transmit the SRS) based on the "code resource setting information" and the "code resource setting rule table." The "code resource setting rule table" used here is the same as that used in terminal 200.

Reception processing section 108 generates a plurality of cyclic shift sequences (that is, a cyclic shift sequence set) corresponding to the plurality of respective specified cyclic shift amounts. Reception processing section 108 extracts a signal component mapped to the specified time/frequency resource from the received signal and demultiplexes a plurality of code-multiplexed SRSs using the generated cyclic shift sequence set.

As described above, according to the present embodiment, in terminal 200, reception processing section 203 receives setting information relating to a reference shift amount given to a cyclic shift sequence used to scramble a reference signal transmitted from a reference antenna port among L antenna ports. Transmission control section 206 specifies an actual shift amount given to the cyclic shift sequence used to scramble the reference signal transmitted from each antenna port based on the code resource setting rule table in which a cyclic shift amount candidate is associated with each antenna port and the setting information, regarding each of reference shift amount candidate groups having shift amounts 0 to N−1 (N is an even number equal to or greater than 8) that the reference shift amount can take. In the above-described code resource setting rule table, an offset pattern made up of offset values of cyclic shift amount candidates associated with each antenna port with respect to a reference shift amount candidate having shift amount X (X is a natural number from 0 to N/2−1 inclusive) is different from an offset pattern made up of offset values of cyclic shift amount candidates associated with each antenna port with respect to a reference shift amount candidate having X+N/2. Transmission signal forming section 207 forms a cyclic shift sequence based on the specified actual shift amount.

In base station 100, setting section 101 generates setting information relating to a reference shift amount given to a cyclic shift sequence used to scramble a reference signal transmitted from a reference antenna port among L (L is a natural number equal to or greater than 2) antenna ports. The generated setting information is transmitted to terminal 200 via transmission processing section 104. Furthermore, reception processing section 108 specifies an actual shift amount given to a cyclic shift sequence used to scramble a reference signal transmitted from each antenna port based on the code resource setting rule table in which a cyclic shift amount candidate is associated with each antenna port and setting information for each of reference shift amount candidate groups having shift amounts 0 to N−1 (N is an even number equal to or greater than 8) that the reference shift amount can take, and receives the reference signal using the specified actual shift amount. In the above-described code resource setting rule table, an offset pattern made up of offset values of cyclic shift amount candidates associated with each antenna port with respect to a reference shift amount candidate having shift amount X (X is a natural number from 0 to N/2−1 inclusive) is different from an offset pattern made up of offset values of cyclic shift amount candidates associated with each antenna port corresponding to a reference shift amount candidate of X+N/2.

Embodiment 2

Embodiment 2 relates to a variation of the "code resource setting rule table."

FIG. 8 is a diagram illustrating a code resource setting rule table according to Embodiment 2 of the present invention.

In FIG. 8, basic offset pattern "0, 4, 2, 6" is applied to cyclic shift amount candidates 0 to 3 of an antenna port with identification number 0, whereas an offset pattern different from the basic offset pattern is applied to cyclic shift amount candidates 4 to 7 of the antenna port with identification number 0. That is, in generalized expression, different offset patterns are applied to cyclic shift amount candidate X and cyclic shift amount candidate X+4 of the antenna port with identification number 0. In particular, the basic offset pattern is applied to cyclic shift amount candidate X, whereas offset pattern "0, 1, 2, 3" or "0, −1, −2, −3" is applied to cyclic shift amount candidate X+4. Here, X is an integer from 0 to 3 inclusive.

That is, by using offset pattern "0, 1, 2, 3" or "0, −1, −2, −3," the four cyclic shift amounts that constitute the cyclic shift amount set have continuous values.

Furthermore, in FIG. 8, regarding cyclic shift amount candidate X+4 to which an offset pattern other than the basic offset pattern is applied, one of "0, 1, 2, 3" and "0, −1, −2, −3" is applied when X+4 is an even number, and the other is applied when X+4 is an odd number.

Figure 9:
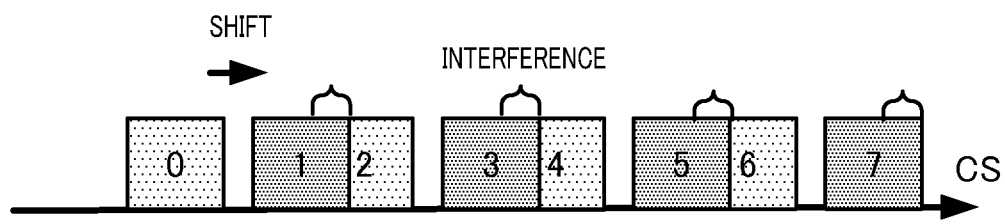
FIG. 9 is a diagram illustrating inter-sequence interference.

When a plurality of terminals 200 transmit SRSs, the number of locations where inter-sequence interference occurs increases depending on differences in transmission timing among terminals. For example, when terminal 200-1 uses shift amount group "0, 4, 2, 6" and terminal 200-2 uses shift amount group "1, 5, 3, 7," if transmission timing of terminal 200-2 is shifted, inter-sequence interference is given to a cyclic shift sequence of all cyclic shift amounts "0, 4, 2, 6" of terminal 200-1 (refer to FIG. 9).

Figure 10:
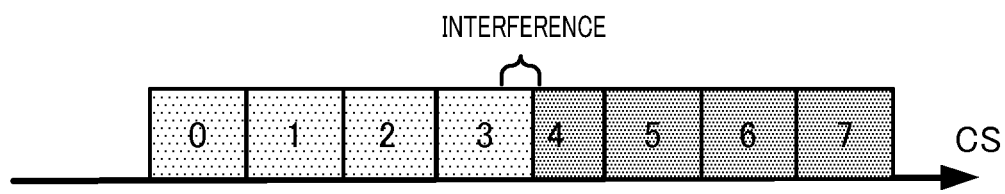
FIG. 10 is a diagram illustrating an effect of using the code resource setting rule table in FIG. 8.

In contrast, as described above, regarding cyclic shift amount candidate X+4, one of "0, 1, 2, 3" and "0, −1, −2, −3" is applied when X+4 is an even number, and the other is applied when X+4 is an odd number, and in this way even when transmission timing is shifted, it is possible to reduce the number of locations where inter-sequence interference occurs. For example, when terminal 200-1 uses shift amount group "4, 5, 6, 7" and terminal 200-2 uses shift amount group "0, 1, 2, 3," even if transmission timing of terminal 200-2 is shifted, inter-sequence interference occurs at only one location of cyclic shift amount "4" of terminal 200-2 (refer to FIG. 10).

If components of a shift amount group are continuous, which antenna port should be associated with each component is not particularly limited. For example, as shown in FIG. 11, even if the cyclic shift amounts used by the antenna port with identification number 1 and the antenna port with identification number 2 are discontinuous, there will be no problem if components of the shift amount group are continuous. In this way, it is possible to create a code resource setting rule table with less bias in the cyclic shift amount used for SRSs.

Embodiment 3

Embodiment 3 relates to a variation of the "code resource setting rule table."

FIG. 12 is a diagram illustrating a code resource setting rule table according to Embodiment 3 of the present invention.

In Embodiment 3 as in the case of other embodiments, different offset patterns are applied to cyclic shift amount candidate X and cyclic shift amount candidate X+4 of the antenna port with identification number 0. Furthermore, in Embodiment 3, different offset patterns are applied to cyclic shift amount candidate 2M (M=0, 1, . . . ) and cyclic shift amount candidate 2M+1. While a basic offset pattern is applied to one of cyclic shift amount candidate 2M and cyclic shift amount candidate 2M+1, offset pattern "0, 1, 2, 3" or "0, −1, −2, −3" is applied to the other (refer to FIG. 12).

Here, in the code resource setting rule table shown in FIG. 11, when attention is focused on a cyclic shift amount group to which an offset pattern other than the basic offset pattern is applied, the cyclic shift amount pairs corresponding to identification numbers 0 and 1 used for 2-antenna transmission are limited to "4, 3" "5, 6," "6, 5" and "7, 0" and no pair exists for cyclic shift amounts 1 and 2. That is, cyclic shift amounts 1 and 2 cannot be allocated.

In contrast, as shown in FIG. 12, while the basic offset pattern is applied to one of cyclic shift amount candidate 2M and cyclic shift amount candidate 2M+1, offset pattern "0, 1, 2, 3" or "0, −1, −2, −3" is applied to the other, and it is thereby possible to reduce the bias in the cyclic shift amount applied to the antenna port with identification number 1. To be more specific, in FIG. 12, when attention is focused on the cyclic shift amount group to which an offset pattern other than the basic offset pattern is applied, the cyclic shift amount pairs corresponding to identification numbers 0 and 1 used for 2-antenna transmission are "4, 5", "1, 0," "6, 7" and "3, 2" and the cyclic shift amount is more distributed, with less bias.

Based on the code resource setting rule table shown in FIG. 11, FIG. 12 shows a code resource setting rule table obtained by applying different offset patterns to cyclic shift amount candidate 2M (M=0,1, . . . ) and cyclic shift amount candidate 2M+1 as an example. That is, in code resource setting rule tables other than that in FIG. 11 shown in the present specification, different offset patterns may be applied to cyclic shift amount candidate 2M (M=0,1, . . . ) and cyclic shift amount candidate 2M+1.

Furthermore, when different offset patterns are applied to cyclic shift amount candidate 2M (M=0,1, . . . ) and cyclic shift amount candidate 2M+1, if there are two continuous cyclic offset amount candidates among cyclic shift amount candidates of the reference antenna port which are associated with offset patterns other than the basic offset pattern, offset pattern "0, 1, 2, 3" may be associated with one (for example, one with a smaller value), and offset pattern "0, −1, −2, −3" may be associated with the other (for example, one with a greater value). In FIG. 13, while offset pattern "0, 1, 2, 3" is associated with cyclic shift amount 3 of the antenna port with identification number 0, offset pattern "0, −1, −2, −3" is associated with cyclic shift amount 4 of the antenna port with identification number 0.

This makes it possible to cause the cyclic shift amount to be distributed in both cases of 2-port antenna transmission and 4-port antenna transmission, thus preventing bias. As a result, the flexibility of SRS resource allocation can be improved.

Embodiment 4

Embodiment 4 relates to a variation in the "code resource setting rule table."

FIG. 14 is a diagram illustrating a code resource setting rule table according to Embodiment 4 of the present invention.

In FIG. 14, while basic offset pattern "0, 4, 2, 6" is applied to cyclic shift amount candidates 0 to 3 of an antenna port with identification number 0, an offset pattern different from the basic offset pattern is applied to cyclic shift amount candidates 4 to 7 of the antenna port with identification number 0. That is, in generalized expression, different offset patterns are applied to cyclic shift amount candidate X and cyclic shift amount candidate X+4 of the antenna port with identification number 0. In particular, while the basic offset pattern is applied to cyclic shift amount candidate X, offset pattern "0, 4, 1, 5" or offset pattern "0, 4, 3, 7" is applied to cyclic shift amount candidate X+4. That is, with the offset pattern group applied to cyclic shift amount candidates 4 to 7 of the antenna port with identification number 0, all offset patterns are common in that the difference in the cyclic shift amount applied to the antenna port with identification number 0 and the antenna port with identification number 1, and the difference in the cyclic shift amount applied to the antenna port with identification number 2 and the antenna port with identification number 3 are 4. In contrast, with the offset pattern group applied to cyclic shift amount candidates 4 to 7 of the antenna port with identification number 0, there are a plurality of values in the difference in the cyclic shift amount applied to the antenna port with identification number 1 and the antenna port with identification number 2.

Figure 15:
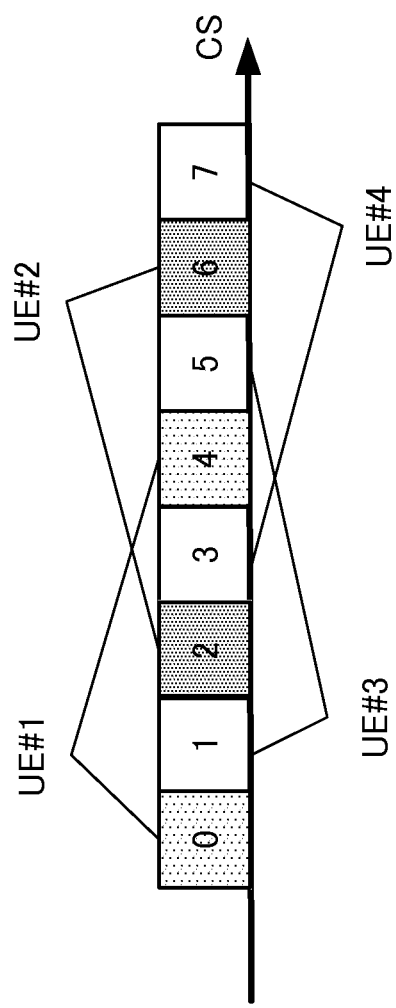
FIG. 15 is a diagram illustrating a case where an offset pattern applied to 2-antenna port transmission is assumed to be "0, 4"

Here, 2-antenna port transmission is more likely to be applied to terminal 200 than 4-antenna port transmission. As shown in FIG. 15, if an offset pattern applied to 2-antenna port transmission is assumed to be "0, 4," cyclic shift amount pairs "0, 4", "2, 6," "1, 5" and "3, 7" are used for terminals 200-1 to 4, respectively, (denoted by UEs #1 to 4 in FIG. 15).

In this state, two terminals 200 are assumed to end SRS transmission. For example, when UE#1 and UE#2 end SRS transmission, cyclic shift amount set "0, 4, 2, 6" becomes vacant. Furthermore, when UE#1 and UE#3 end SRS transmission, cyclic shift amount set "0, 4, 1, 5" becomes vacant. Furthermore, when UE#1 and UE#4 end SRS transmission, cyclic shift amount set "0, 4, 3, 7" becomes vacant. Furthermore, when UE#2 and UE#4 end SRS transmission, cyclic shift amount set "2, 6, 3, 7" becomes vacant. Furthermore, when UE#3 and UE#4 end SRS transmission, cyclic shift amount set "1, 5, 3, 7" becomes vacant. Assuming that SRSs of 4 antenna ports are flexibly allocated to these vacant CSs, offset amount sets "0, 4, 2, 6," "0, 4, 1, 5" and "0, 4, 3, 7" are effective.

Therefore, while the basic offset pattern is applied to cyclic shift amount candidate X, offset pattern "0, 4, 1, 5" or offset pattern "0, 4, 3, 7" is applied to cyclic shift amount candidate X+4. Thereby, even if two vacant CSs with a 4-CS interval exist, it is possible to make SRS resource allocation easier in 4-antenna port transmission. For example, even if vacant CSs are "0, 4, 1, 5," SRS resources for 4-antenna port transmission can be allocated.

Embodiment 5

Embodiment 5 relates to a variation in the "code resource setting rule table."

FIG. 16 is a diagram illustrating a code resource setting rule table according to Embodiment 5 of the present invention.

In FIG. 16, while basic offset pattern "0, 4, 2, 6" is applied to cyclic shift amount candidates 0 to 3 of an antenna port with identification number 0, an offset pattern different from the basic offset pattern is applied to cyclic shift amount candidates 4 to 7 of the antenna port with identification number 0. That is, in generalized expression, different offset patterns are applied to cyclic shift amount candidate X and cyclic shift amount candidate X+4 of the antenna port with identification number 0. In particular, while a basic offset pattern is applied to cyclic shift amount candidate X, offset pattern "0, 3, A, B" or "0, 5, A, B" is applied to cyclic shift amount candidate X+4. Here, A and B are different values. Furthermore, A and B are natural numbers other than 0 and 3 among 0 to 7 in a case of offset pattern "0, 3, A, B" and natural numbers other than 0 and 5 among 0 to 7 in a case of offset pattern "0, 5, A, B."

Here, in Embodiment 4, in order for the receiving side to demultiplex SRSs with high accuracy in a case of 2-antenna port transmission, the difference in applied cyclic shift amount between the antenna port with identification number 0 and the antenna port with identification number 1 is designed to be 4. However, when emphasis is placed on the flexibility of SRS resource allocation in a case of 2-antenna port transmission, it is preferable to provide a plurality of difference values in the applied cyclic shift amount between the antenna port with identification number 0 and the antenna port with identification number 1. Thus, like the present embodiment, in order for the receiving side to demultiplex SRSs with high accuracy in a case of 2-antenna port transmission, for example, the difference in the applied cyclic shift amount between the antenna port with identification number 0 and the antenna port with identification number 1 is 3 or 5 which has the next highest demultiplexing performance after 4. This makes it possible to prevent the demultiplexing accuracy from decreasing and also improve the flexibility of SRS resource allocation.

Embodiment 6

Embodiment 6 relates to a variation in the "code resource setting rule table."

FIG. 17 is a diagram illustrating a code resource setting rule table according to Embodiment 6 of the present invention.

In FIG. 17, while basic offset pattern "0, 4, 2, 6" is applied to cyclic shift amount candidates 0 to 3 of an antenna port with identification number 0, an offset pattern different from the basic offset pattern is applied to cyclic shift amount candidates 4 to 7 of the antenna port with identification number 0. That is, in generalized expression, different offset patterns are applied to cyclic shift amount candidate X and cyclic shift amount candidate X+4 of the antenna port with identification number 0. In particular, while the basic offset pattern is applied to cyclic shift amount candidate X, offset pattern "0, 2, A, B" or "0, 6, A, B" is applied to cyclic shift amount candidate X+4. Here, A and B are natural numbers other than 0 and 2 among 0 to 7 in a case of offset pattern "0, 2, A, B" and natural numbers other than 0 and 6 among 0 to 7 in a case of offset pattern "0, 6, A, B."

Here, in Embodiment 5, 3 or 5 is added as the difference value between the cyclic shift amount applied to the antenna port with identification number 0 and the cyclic shift amount applied to the antenna port with identification number 1 to improve the flexibility of SRS resource allocation while maintaining high SRS demultiplexing performance. However, when the difference value between the cyclic shift amount applied to the antenna port with identification number 0 and the cyclic shift amount applied to the antenna port with identification number 1 is assumed to be 3 or 5, if this is combined with cyclic shift amount set "0, 4, 2, 6," there may be cases where SRS resource allocation becomes more complicated. For example, when terminal 200 to which cyclic shift amount set "0, 4, 2, 6" is allocated ends SRS transmission at 4 antenna ports, resources of cyclic shift amount set "0, 4, 2, 6" become vacant, but SRS resources may be unable to be allocated depending on a cyclic shift amount set in which the difference value between the cyclic shift amount applied to the antenna port with identification number 0 and the cyclic shift amount applied to the antenna port with identification number 1 is 3 or 5. Thus, when emphasis is placed on the flexibility of SRS resource allocation as in the case of the present embodiment, 2 or 6 is preferably added as the difference value between the cyclic shift amount applied to the antenna port with identification number 0 and the cyclic shift amount applied to the antenna port with identification number 1.

Applying the basic offset pattern to cyclic shift amount candidate X and applying offset pattern "0, 2, 4, 6" to cyclic shift amount candidate X+4 makes it possible to secure the flexibility of SRS resource allocation in 2-transmitting-antenna port transmission which has a high probability of occurrence, and also maximize a CS interval between antenna ports in 4-transmitting-antenna port transmission which has a relatively low probability of occurrence, and thereby maximize the SRS demultiplexing accuracy.

Embodiment 7

Embodiment 7 relates to a variation in the "code resource setting rule table."

FIG. 18 is a diagram illustrating a code resource setting rule table according to Embodiment 7 of the present invention.

In FIG. 18, different offset patterns are applied to cyclic shift amount candidate X and cyclic shift amount candidate X+4 of an antenna port with identification number 0. Furthermore, different offset patterns are applied to a cyclic shift amount candidate group in which the cyclic shift amount of the antenna port with identification number 0 is an even number (that is, 0, 2, 4, 6). Basic offset pattern "0, 4, 2, 6" is applied to one cyclic shift amount candidate of the cyclic shift amount candidate group in which the cyclic shift amount of the antenna port with identification number 0 is an even number. In FIG. 18, particularly, basic offset pattern "0, 4, 2, 6" is associated with cyclic shift amount candidate 0 of the antenna port with identification number 0. Offset pattern "0, 1, 2, 3" is associated with cyclic shift amount candidate 2 of the antenna port with identification number 0, offset pattern "0, 2, 4, 6" is associated with cyclic shift amount candidate 4 of the antenna port with identification number 0, and offset pattern "0, −1, −2, −3" is associated with cyclic shift amount candidate 6 of the antenna port with identification number 0.

Figure 19:
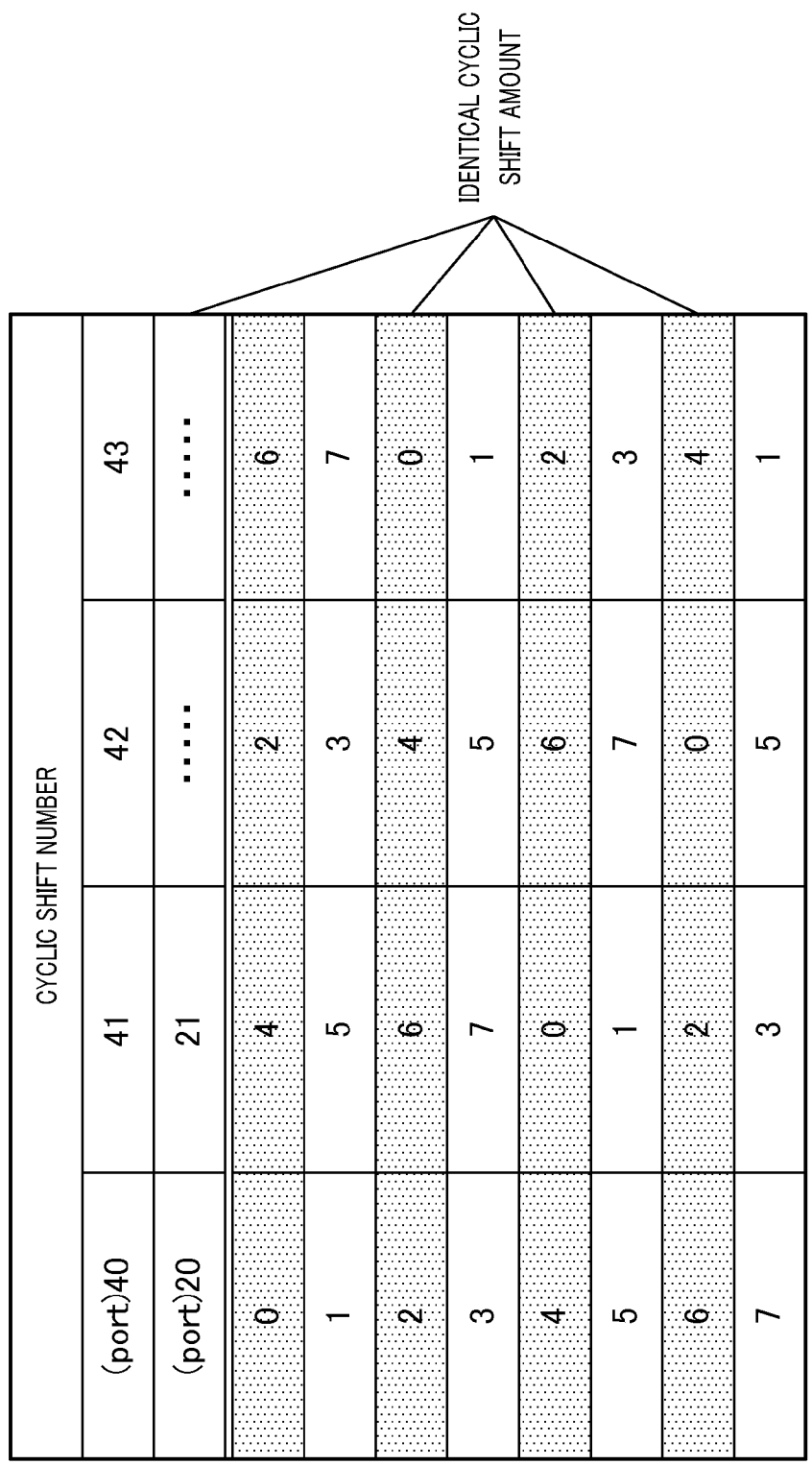
FIG. 19 is a diagram illustrating a problem with the conventional correspondence table shown in FIG. 2.

Here, in the conventional correspondence table shown in FIG. 2, when 2-antenna port transmission is assumed, the pair of the cyclic shift amount associated with the antenna port with identification number 0 and the cyclic shift amount associated with the antenna port with identification number 1 varies depending on whether the cyclic shift amount candidate is X or X+2 of the antenna port with identification number 0. However, when only 4-antenna port transmission is assumed, the cyclic shift amount candidate group whose cyclic shift amount is an even number (that is, 0, 2, 4, 6) of the antenna port with identification number 0 has the same cyclic shift amount that constitutes the cyclic shift amount set (refer to FIG. 19).

In contrast, the present embodiment associates cyclic shift amount candidate X and cyclic shift amount candidate X+4 of the antenna port with identification number 0 with different offset patterns, and also associates the cyclic shift amount candidate group whose cyclic shift amount is an even number (that is, 0, 2, 4, 6) of the antenna port with identification number 0 with different offset patterns. This makes it possible to improve the flexibility of SRS resource allocation without increasing the amount of signaling for notification of a cyclic shift amount.

Embodiment 8

Unlike Embodiments 1 to 7, Embodiment 8 intends to improve the flexibility of SRS resource allocation within a frequency domain. Since a base station and a terminal of Embodiment 8 have basic configurations common to those of base station 100 and terminal 200 of Embodiment 1, their configurations will be described with reference to FIGS. 5 and 6.

Setting section 101 of base station 100 in Embodiment 8 generates "candidate resource setting information" for setting "candidate resources" of setting target terminal 200. The candidate resource setting information can be divided into "time resource setting information" and "code frequency resource setting information."

Reception processing section 108 specifies a resource to which an SRS is mapped based on the setting information and the trigger information received from setting section 101.

To be more specific, reception processing section 108 specifies a time resource to which the SRS is mapped based on the "time resource setting information" and the trigger information. Furthermore, reception processing section 108 specifies a code frequency resource (that is, cyclic shift amount and frequency of a cyclic shift sequence used to transmit the SRS) to which the SRS is mapped based on the "code frequency resource setting information" and the "code frequency resource setting rule table."

Reception processing section 108 generates a plurality of cyclic shift sequences (that is, cyclic shift sequence set) corresponding to the plurality of respective specified cyclic shift amounts. Reception processing section 108 then extracts a signal component mapped to the specified time/frequency resource from the received signal and demultiplexes a plurality of code-multiplexed SRSs using the generated cyclic shift sequence set.

In terminal 200 of Embodiment 8, transmission control section 206 sets a candidate resource to which its own terminal maps an SRS.

To be more specific, transmission control section 206 specifies a candidate time resource based on setting information (time resource setting information) received from reception processing section 203.

Furthermore, transmission control section 206 specifies a candidate code frequency resource (that is, cyclic shift amount and frequency of a cyclic shift sequence used to transmit an SRS) based on the setting information (code frequency resource setting information) received from reception processing section 203 and the "code frequency resource setting rule table." When the trigger information is received from reception processing section 203, transmission control section 206 outputs information relating to a cyclic shift amount of a cyclic shift sequence used to transmit an SRS and the frequency to transmission signal forming section 207. The candidate frequency resource set in this terminal 200 will be described in detail later.

Transmission signal forming section 207 maps the SRS received from reference signal generation section 204 to an RS mapping resource indicated by RS mapping information. Transmission signal forming section 207 then applies a cyclic shift corresponding to information relating to the cyclic shift amount received from transmission control section 206 to a reference sequence, thereby generates a cyclic shift sequence set and multiplies the SRS mapped to the RS mapping resource by the cyclic shift sequence set. The SRSs multiplied by the plurality of respective cyclic shift sequences that constitute the cyclic shift sequence set are transmitted from the corresponding antenna ports. The plurality of SRSs are thereby code-multiplexed.

Operations of base station 100 and terminal 200 of Embodiment 8 configured as described above will be described. In particular, a setting process for candidate code resources and candidate frequency resources on setting target terminal 200, an SRS transmission process using candidate code resources and candidate frequency resources by terminal 200 and a reception process for an SRS transmitted from terminal 200 by base station 100 will be described here. Furthermore, a case will be described where terminal 200 transmits SRSs using two antenna ports or four antenna ports.

<Setting Process for Candidate Code Resources on Setting Target Terminal 200>

Setting section 101 generates candidate code frequency resource setting information to set candidate code resources and candidate frequency resources for setting target terminal 200. To be more specific, setting section 101 generates information relating to the shift amount of a cyclic shift sequence used for SRSs transmitted from the reference antenna port of setting target terminal 200. Here, particularly, the cyclic shift amount regarding an antenna port whose antenna port identification information is zero is used as information relating to the cyclic shift amount.

The candidate code frequency resource setting information generated in this way is transmitted to terminal 200.

<SRS Transmission Process Using Candidate Code Frequency Resources by Terminal 200>

Transmission control section 206 sets candidate code frequency resources to which its own terminal maps SRSs. To be more specific, transmission control section 206 specifies candidate code frequency resources (that is, cyclic shift amount and frequency of the cyclic shift sequence used to transmit SRSs) based on the code frequency resource setting information received from reception processing section 203 and the code frequency resource setting rule table.

FIG. 20 is a diagram illustrating a code frequency resource setting rule table according to Embodiment 8 of the present invention. In the code frequency resource setting rule table, for each of a plurality of cyclic shift amount candidates of a reference antenna port, four antenna port identification numbers are associated with cyclic shift amounts and frequencies corresponding to the respective antenna port identification numbers. The number of cyclic shift amount candidates is 8 from 0 to 7. In FIG. 20, in the code frequency resource setting rule table, a fixed offset pattern "0, 4, 2, 6" is applied to all cyclic shift amount candidates 0 to 7 of the antenna port with identification number 0. Furthermore, in FIG. 20, for cyclic shift amount candidates 0 to 3 of the antenna port with identification number 0, one frequency band (frequency 1 in FIG. 20) is associated with all antenna ports, whereas for cyclic shift amount candidates 4 to 7 of the antenna port with identification number 0, one frequency band (frequency 1 in FIG. 20) is associated with the antenna ports with identification number 0 and identification number 1, and one frequency band (frequency 2 in FIG. 20) is associated with the antenna ports with identification number 2 and identification number 3. That is, in generalized expression, different frequency patterns are applied to cyclic shift amount candidate X and cyclic shift amount candidate X+4 of the antenna port with identification number 0. Here, X is an integer from 0 to 3 inclusive.

FIG. 21 is a diagram illustrating another example of the code frequency resource setting rule table according to Embodiment 8 of the present invention. In FIG. 21, for cyclic shift amount candidates 0 to 3 of the antenna port with identification number 0, one frequency band (frequency 1 in FIG. 21) is associated with all antenna ports. On the other hand, for cyclic shift amount candidates 4 to 7 of the antenna port with identification number 0, one frequency band (frequency 1 in FIG. 21) is associated with the antenna ports with identification number 0 and identification number 2, and one frequency band (frequency 2 in FIG. 21) is associated with the antenna ports with identification number 1 and identification number 3. Above-described frequency 1 and frequency 2 may be a subcarrier block made up of continuous subcarrier groups or a subcarrier group made up of discretely arranged subcarrier groups (for example, Comb in LTE). To be more specific, frequency 1 may be substituted by Comb#0 and frequency 2 may be substituted by Comb#1. That is, cyclic shift amount candidates 0 to 3 of the antenna port with identification number 0 may use only one Comb and cyclic shift amount candidates 4 to 7 of the antenna port with identification number 0 may use only a plurality of Combs. The fixed offset pattern "0, 4, 2, 6" may have a different sequence such as "0, 2, 4, 6." Furthermore, instead of using tables such as those shown in FIG. 20 and FIG. 21, for example, equations may also be used as long as similar processes can be performed. For example, the following equation may be used instead of the figures.

FIG. 20 may also be expressed by equation 1.

(Equation 1)

$$n_{SRS}^{Comb,\tilde{p}} = (n_{SRS}^{Comb} + x) \bmod 2, \quad \tilde{p} \in \{0, \ldots, N_p - 1\} \quad [1]$$

$$x = \begin{cases} 0 & \text{for } n_{SRS}^{CS} = 0 \sim 3 \\ \left\lfloor \dfrac{\tilde{p}}{2} \right\rfloor & \text{for } n_{SRS}^{CS} = 4 \sim 7 \end{cases}$$

$n_{SRS}^{Comb,\tilde{p}}$ is information indicating SRS arrangement of an antenna port with identification number $\tilde{p}$ (for example, frequency 1 and frequency 2 or Comb#0 and Comb#1).

$n_{SRS}^{CS}$ and $n_{SRS}^{Comb}$ are information indicating a cyclic shift amount and SRS arrangement of an antenna port with identification number 0 notified of by the base station.

$\lfloor A \rfloor$ is a maximum integer smaller than A. Frequency 1 (or Comb#0) when $n_{SRS}^{Comb,\tilde{p}}$ is 0, or frequency 2 (or Comb#1) when $n_{SRS}^{Comb,\tilde{p}}$ is 1 is applied at the terminal station and the base station.

$n_{SRS}^{Comb}$ may be a value (0 or 1) explicitly notified of by the base station or may be implicitly notified of or a fixed value.

$n_{SRS}^{CS}$ need not be limited to the classification such as 0 to 3 and 4 to 7 and may be changed based on Embodiments 1 to 7 or the like.

$N_p$ is the number of antenna ports used for SRS transmission.

Similarly, FIG. 21 can also be expressed by equation 2.

(Equation 2)

$$n_{SRS}^{Comb,\tilde{p}} = (n_{SRS}^{Comb} + x) \bmod 2, \quad \tilde{p} \in \{0, \ldots, N_p - 1\} \quad [2]$$

$$x = \begin{cases} 0 & \text{for } n_{SRS}^{CS} = 0 \sim 3 \\ \tilde{p} & \text{for } n_{SRS}^{CS} = 4 \sim 7 \end{cases}$$

Furthermore, when FIG. 21 and FIG. 20 are used assuming that the numbers of antenna ports is 2 and 4 respectively, equation 3 is obtained.

(Equation 3)

$$n_{SRS}^{Comb,\tilde{p}} = (n_{SRS}^{Comb} + x) \bmod 2, \quad \tilde{p} \in \{0, \ldots, N_p - 1\} \quad [3]$$

$$x = \begin{cases} 0 & \text{for } n_{SRS}^{CS} = 0 \sim 3 \\ \left\lfloor \dfrac{2\tilde{p}}{N_p} \right\rfloor & \text{for } n_{SRS}^{CS} = 4 \sim 7 \end{cases}$$

Here, in Embodiments 1 to 7, different offset patterns are associated with cyclic shift amount candidate X and cyclic shift amount candidate X+4 of the antenna port with identification number 0. However, the method for improving the flexibility of SRS resource allocation is not limited to this. That is, as described above, the flexibility of SRS resource allocation can also be improved by associating cyclic shift amount candidate X and cyclic shift amount candidate X+4 of the antenna port with identification number 0 with different frequency patterns.

Frequency 1 and frequency 2 may also be considered as amounts of offset in the frequency domain. For example, when base station 100 notifies of information indicating Comb#0 and cyclic shift amount candidate 0 of the antenna port with identification number 0, terminal 200 transmits an SRS using only Comb#0, whereas when base station 100 notifies of information indicating Comb#1 and cyclic shift amount 0 of the antenna port with identification number 0, terminal 200 transmits an SRS using only Comb#1.

Other Embodiments (1) In the above each embodiment, some of the plurality of cyclic shift amount candidates of the reference antenna port may be associated with trigger information (that is, trigger bits in PDCCH). For example, using setting information, cyclic shift amount candidate 0 of the reference antenna port is associated with trigger information 1 of PDCCH, and cyclic shift amount candidate 4 of the reference antenna port is associated with trigger information 2 of PDCCH. When base station 100 notifies terminal 200 of trigger information 1 of PDCCH, terminal 200 transmits an SRS using a cyclic shift amount set with which cyclic shift amount candidate 0 of the reference antenna port is associated, and when base station 100 notifies terminal 200 of trigger information 2 of PDCCH, terminal 200 transmits an SRS using a cyclic shift amount set with which cyclic shift amount candidate 4 of the reference antenna port is associated.

(2) The table described in the above each embodiment is applicable to one of a case of only 2-antenna port transmission, a case of only 4-antenna port transmission, and a case of both 2-antenna port transmission and 4-antenna port transmission. Furthermore, different tables may be used for a case of 4-antenna port transmission and for a case of 2-antenna port transmission.

(3) The above each embodiment has been described assuming that the same cyclic shift amount of the antenna port with identification number 0 is used when one antenna port is used, and when two or four antenna ports are used. However, the present invention is not limited to this, and the correspondence between the antenna port with identification number 0 and the cyclic shift amount may differ when one antenna port is used, and when two or four antenna ports are used.

(4) The above each embodiment has described SRSs (for example, DA-SRS, P-SRS), but the present invention is not limited to this, and any reference signal may be applicable as long as it can be code-multiplexed with a cyclic shift sequence.

(5) The antenna port in the above each embodiment represents a logical antenna (antenna group) formed by one or a plurality of physical antennas. In other words, the antenna port is not limited to represent one physical antenna, and may include an array antenna formed by a plurality of antennas, for example. For example, the number of physical antennas for forming the antenna port is not defined, and the antenna port is defined as a minimum unit by which a terminal can transmit reference signals. The antenna port may also be defined as a minimum unit for multiplying weighting of a precoding vector.

(6) A case has been described in the above each embodiment where the number of notification bits is 3 and cyclic shift amount candidates are 0 to 7 as a premise, but the present invention is not limited to this. For example, the number of notification bits may be 4 and cyclic shift amount candidates may be 0 to 15. In this case, offset amount set "0, 4, 2, 6" may be an M (M=2 in a case of 4 bits) multiple of the offset amount such as "0, 8, 4, 12." Furthermore, the cyclic shift amounts of the antenna ports with identification numbers 1 to 3 are not limited to the values in the figures, either. For example, the cyclic shift amounts may be offset amount set "0, 2, 4, 6."

(7) Although the above each embodiment has been described using a case where the present invention is implemented with hardware, as an example, the present invention can be implemented with software in interworking with hardware.

Furthermore, each function block employed in the explanation of the above each embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2011-001829, filed on Jan. 7, 2011 and Japanese Patent Application No. 2011-009870, filed on Jan. 20, 2011, including the specification, drawings and abstract, is incorporated herein by reference in their entirety.

INDUSTRIAL APPLICABILITY

The transmitter apparatus, receiver apparatus, transmission method, and reception method of the present invention are useful to improve the flexibility of SRS resource allocation without increasing the amount of signaling for notification of a cyclic shift amount.

REFERENCE SIGNS LIST

100 base station
101 setting section
102, 103 coding/modulation section
104 transmission processing section
105, 208 transmitting section
106, 201 antenna
107, 202 receiving section
108, 203 reception processing section
109 data receiving section 110 receiving quality measuring section
200 terminal
204 reference signal generation section
205 data signal generation section
206 transmission control section
207 transmission signal forming section

The invention claimed is:

1. A receiver apparatus comprising:
   a receiver which, in operation, receives a reference signal mapped to a frequency resource corresponding to each of a plurality of antenna ports that are determined based on a first correspondence or a second correspondence, the reference signal being generated using information relating to a cyclic shift amount; and
   a channel quality measurer which, in operation, measures channel quality using the reference signal, wherein:
   the first correspondence is different from the second correspondence, the first correspondence defining a correspondence between each of the plurality of antenna ports and the frequency resource when the information relating to the cyclic shift amount is X, and the second correspondence defining a correspondence between each of the plurality of antenna ports and the frequency resource when the information relating to the cyclic shift amount is X+N/2 (where X is an integer from 0 to N/2−1 inclusive, and N is the number of candidates of the cyclic shift amount).

2. The receiver apparatus according to claim 1, wherein frequency resources corresponding to the plurality of respective antenna ports in the first correspondence are identical and frequency resources corresponding to the plurality of a respective antenna ports in the second correspondence are not identical.

3. The receiver apparatus according to claim 1, wherein:
   frequency resources corresponding to the plurality of respective antenna ports in the first correspondence are identical, and
   of the plurality of antenna ports in the second correspondence, frequency resources corresponding to odd-numbered antenna ports are different from frequency resources corresponding to even-numbered antenna ports.

4. The receiver apparatus according to claim 1, wherein frequency resources corresponding to the plurality of respective antenna ports in the first correspondence are identical to frequency resources corresponding to even-numbered antenna ports in the second correspondence.

5. The receiver apparatus according to claim 1, wherein:
   when the number of the plurality of antenna ports is 2, frequency resources corresponding to all antenna ports in the first correspondence are identical to frequency resources corresponding to all antenna ports in the second correspondence, and
   when the number of the plurality of antenna ports is 4, frequency resources corresponding to the plurality of respective antenna ports in the first correspondence are identical, and of the plurality of antenna ports in the second correspondence, frequency resources corresponding to odd-numbered antenna ports are different from frequency resources corresponding to even-numbered antenna ports.

6. The receiver apparatus according to claim 1, wherein frequency resources corresponding to all antenna ports in the first correspondence are identical, and
   in the second correspondence, frequency resources corresponding to two antenna ports where an interval between cyclic shift amounts of the two antenna ports is [N/2] are identical, and frequency resources corresponding to two antenna ports where an interval between cyclic shift amounts of the two antenna ports is [N/4] are different.

7. The receiver apparatus according to claim 1, wherein the information relating to the cyclic shift amount corresponds to a cyclic shift amount of antenna port number 0, the N is 8 and the X is 0 to 3.

8. The receiver apparatus according to claim 1, wherein the frequency resources are a comb-like subcarrier group.

9. A reception method comprising:
   receiving a reference signal mapped to a frequency resource corresponding to each of a plurality of antenna ports that are determined based on a first correspondence or a second correspondence, the reference signal being generated using information relating to a cyclic shift amount; and
   measuring channel quality using the reference signal, wherein:
   the first correspondence is different from the second correspondence, the first correspondence defining a correspondence between each of the plurality of antenna ports and the frequency resource when the information relating to the cyclic shift amount is X, and the second correspondence defining a correspondence between each of the plurality of antenna ports and the frequency resource when the information relating to the cyclic shift amount is X+N/2 (where X is an integer from 0 to N/2−1 inclusive, and N is the number of candidates of the cyclic shift amount).

10. The reception method according to claim 9, wherein frequency resources corresponding to the plurality of respective antenna ports in the first correspondence are identical and frequency resources corresponding to the plurality of a respective antenna ports in the second correspondence are not identical.

11. The reception method according to claim 9, wherein:
    frequency resources corresponding to the plurality of respective antenna ports in the first correspondence are identical, and
    of the plurality of antenna ports in the second correspondence, frequency resources corresponding to odd-numbered antenna ports are different from frequency resources corresponding to even-numbered antenna ports.

12. The reception method according to claim 9, wherein frequency resources corresponding to the plurality of respective antenna ports in the first correspondence are identical to frequency resources corresponding to even-numbered antenna ports in the second correspondence.

13. The reception method according to claim 9, wherein:
    when the number of the plurality of antenna ports is 2, frequency resources corresponding to all antenna ports in the first correspondence are identical to frequency resources corresponding to all antenna ports in the second correspondence, and
    when the number of the plurality of antenna ports is 4, frequency resources corresponding to the plurality of respective antenna ports in the first correspondence are identical, and of the plurality of antenna ports in the second correspondence, frequency resources corresponding to odd-numbered antenna ports are different from frequency resources corresponding to even-numbered antenna ports.

14. The reception method according to claim 9, wherein frequency resources corresponding to all antenna ports in the first correspondence are identical, and in the second correspondence, frequency resources corresponding to two antenna ports where an interval between cyclic shift amounts of the two antenna ports is [N/2] are identical, and frequency resources corresponding to two antenna ports where an interval between cyclic shift amounts of the two antenna ports is [N/4] are different.

15. The reception method according to claim 9, wherein the information relating to the cyclic shift amount corresponds to a cyclic shift amount of antenna port number 0, the N is 8 and the X is 0 to 3.

16. The reception method according to claim 9, wherein the frequency resources are a comb-like subcarrier group.

* * * * *